(12) United States Patent  
Lyden

(10) Patent No.: US 12,194,375 B2  
(45) Date of Patent: *Jan. 14, 2025

(54) GAME CONTROLLER

(71) Applicant: Kieran S. Lyden, Portland, OR (US)

(72) Inventor: Kieran S. Lyden, Portland, OR (US)

( * ) Notice: Subject to any disclaimer, the term of this patent is extended or adjusted under 35 U.S.C. 154(b) by 598 days.

This patent is subject to a terminal disclaimer.

(21) Appl. No.: 17/524,373

(22) Filed: Nov. 11, 2021

(65) Prior Publication Data

US 2022/0062756 A1 Mar. 3, 2022

Related U.S. Application Data

(63) Continuation-in-part of application No. 16/681,059, filed on Nov. 12, 2019, now Pat. No. 11,202,960, which is a continuation of application No. 15/415,728, filed on Jan. 25, 2017, now Pat. No. 10,507,385.

(60) Provisional application No. 63/125,548, filed on Dec. 15, 2020, provisional application No. 63/117,674, filed on Nov. 24, 2020.

(51) Int. Cl.
```
A63F 9/24      (2006.01)
A63F 13/214    (2014.01)
A63F 13/24     (2014.01)
A63F 13/235    (2014.01)
```
(52) U.S. Cl.
CPC ............ *A63F 13/24* (2014.09); *A63F 13/214* (2014.09); *A63F 13/235* (2014.09)

(58) Field of Classification Search
None
See application file for complete search history.

(56) References Cited

U.S. PATENT DOCUMENTS

| | | | |
|---|---|---|---|
| 4,508,942 A | 4/1985 | Inaba | |
| 4,739,128 A | 4/1988 | Grisham | |
| 5,551,693 A | 9/1996 | Goto et al. | |
| 5,716,274 A | 2/1998 | Goto et al. | |
| 5,984,548 A * | 11/1999 | Willner | G06F 3/0219 |
| | | | 348/E5.103 |
| 6,019,680 A * | 2/2000 | Cheng | A63F 13/24 |
| | | | 463/37 |
| 6,135,886 A | 10/2000 | Armstrong | |
| 6,193,609 B1 | 2/2001 | Enschut | |

(Continued)

FOREIGN PATENT DOCUMENTS

| | | |
|---|---|---|
| AU | 2012391086 B2 | 4/2014 |
| CN | 112334202 A | 2/2021 |

(Continued)

OTHER PUBLICATIONS

Internet search for "Finger Stylus Ring", accessed Mar. 6, 2024.

(Continued)

*Primary Examiner* — Sunit Pandya
(74) *Attorney, Agent, or Firm* — Westman, Champlin & Koehler, P.A.

(57) ABSTRACT

A game controller for controlling the play of computerized games and other related control systems includes a plurality of pressure sensitive touch controls, capacitive controls, and touch pad controls which are configured to initiate commands and perform other desired operations and functions. The sensitivity of the controls can be adjusted and their function can be programmed and customized.

32 Claims, 22 Drawing Sheets

(56) References Cited

U.S. PATENT DOCUMENTS

| | | | |
|---|---|---|---|
| 6,256,013 B1 | 7/2001 | Siddiqui | |
| 6,313,826 B1 | 11/2001 | Schrum et al. | |
| 6,489,946 B1 | 12/2002 | Takeda et al. | |
| 6,512,511 B2 * | 1/2003 | Willner | A63F 13/24 |
| | | | 348/E5.103 |
| 6,760,013 B2 * | 7/2004 | Willner | G06F 3/0219 |
| | | | 348/E5.103 |
| 6,933,925 B1 | 8/2005 | Gibbons et al. | |
| 7,205,980 B2 | 4/2007 | Maroun | |
| 7,345,674 B2 | 3/2008 | McLoone et al. | |
| D572,254 S | 7/2008 | Goto | |
| D608,784 S | 1/2010 | Biheller | |
| 7,656,389 B2 | 2/2010 | Adan et al. | |
| 7,659,887 B2 | 2/2010 | Larsen et al. | |
| 7,813,774 B2 | 10/2010 | Perez-Noguera | |
| 7,880,727 B2 | 2/2011 | Abanami et al. | |
| 7,939,774 B2 | 5/2011 | Corcoran et al. | |
| 7,948,474 B2 | 5/2011 | Chatterjee et al. | |
| 7,995,035 B2 | 8/2011 | Wu | |
| 8,126,987 B2 | 2/2012 | Chopra et al. | |
| 8,147,339 B1 | 4/2012 | Perry | |
| 8,172,675 B2 | 5/2012 | Migos et al. | |
| 8,229,359 B2 | 7/2012 | Hino et al. | |
| D667,892 S | 9/2012 | Burgess et al. | |
| 8,337,306 B2 | 12/2012 | Larsen et al. | |
| 8,480,491 B2 | 7/2013 | Burgess et al. | |
| 8,496,528 B2 | 7/2013 | Muramatsu | |
| 8,547,334 B2 | 10/2013 | Min-Liang et al. | |
| 8,581,852 B2 | 11/2013 | Izadi et al. | |
| 8,613,665 B2 | 12/2013 | Goto et al. | |
| 8,641,525 B2 | 2/2014 | Burgess et al. | |
| 8,648,822 B2 | 2/2014 | Weiss | |
| 8,665,244 B2 | 3/2014 | Large et al. | |
| 8,672,767 B2 | 3/2014 | Ogasawara et al. | |
| 8,715,080 B2 | 5/2014 | Yasuda et al. | |
| 8,727,882 B2 | 5/2014 | Lum et al. | |
| 8,749,489 B2 | 6/2014 | Ito et al. | |
| 8,754,855 B2 | 6/2014 | Duncan et al. | |
| D709,882 S | 7/2014 | Morris et al. | |
| 8,769,594 B2 | 7/2014 | Perlman et al. | |
| D712,408 S | 9/2014 | Sumii et al. | |
| D712,484 S | 9/2014 | Sumii et al. | |
| D712,971 S | 9/2014 | Huang | |
| D712,972 S | 9/2014 | Sumii et al. | |
| D712,973 S | 9/2014 | Sumii et al. | |
| D715,296 S | 10/2014 | Huang | |
| D717,876 S | 11/2014 | Sumii et al. | |
| D718,390 S | 11/2014 | Sumii et al. | |
| 8,884,907 B2 | 11/2014 | Townsend et al. | |
| D718,818 S | 12/2014 | Sumli et al. | |
| D719,953 S | 12/2014 | Nokuo et al. | |
| 8,913,019 B2 | 12/2014 | Zhao et al. | |
| D721,139 S | 1/2015 | Burgess et al. | |
| 8,926,432 B2 | 1/2015 | Roberts | |
| 8,933,912 B2 | 1/2015 | Ambrus et al. | |
| 8,982,051 B2 | 3/2015 | Rosenfeld et al. | |
| D727,430 S | 4/2015 | Sumii et al. | |
| D728,030 S | 4/2015 | Burgess et al. | |
| 9,003,461 B2 | 4/2015 | Perlman et al. | |
| 9,005,025 B2 | 4/2015 | Joynes et al. | |
| D730,451 S | 5/2015 | Burgess et al. | |
| 9,029,721 B2 | 5/2015 | Keda et al. | |
| D733,140 S | 6/2015 | Sumii et al. | |
| D733,802 S | 7/2015 | Burgess et al. | |
| 9,089,770 B2 | 7/2015 | Burgess et al. | |
| 9,098,117 B2 | 8/2015 | Lutz et al. | |
| 9,116,555 B2 | 8/2015 | Nakayama et al. | |
| 9,128,539 B2 | 9/2015 | Ng | |
| 9,152,288 B2 | 10/2015 | Dietz | |
| 9,174,122 B2 | 11/2015 | Miyazaki | |
| 9,174,124 B2 | 11/2015 | Hammontree et al. | |
| 9,202,508 B2 | 12/2015 | Eto | |
| 9,223,471 B2 | 12/2015 | Buxton et al. | |
| 9,227,141 B2 | 1/2016 | Mays, III et al. | |
| D748,734 S | 2/2016 | Burgess et al. | |
| 9,250,703 B2 | 2/2016 | Hernandez-Abrego et al. | |
| 9,250,753 B2 | 2/2016 | Westhues et al. | |
| 9,251,701 B2 | 2/2016 | Plagge et al. | |
| 9,285,907 B2 | 3/2016 | Weiss et al. | |
| 9,286,059 B2 | 3/2016 | Hatakeyama | |
| 9,289,688 B2 * | 3/2016 | Burgess | A63F 13/20 |
| 9,308,450 B2 | 4/2016 | Burgess et al. | |
| 9,308,451 B2 | 4/2016 | Burgess et al. | |
| 9,335,900 B2 | 5/2016 | Weiss | |
| 9,345,966 B2 | 5/2016 | Miura et al. | |
| 9,352,229 B2 | 5/2016 | Burgess et al. | |
| 9,354,804 B2 | 5/2016 | Berkes et al. | |
| 9,372,588 B2 | 6/2016 | Dietz et al. | |
| 9,377,646 B2 | 6/2016 | Westhues et al. | |
| 9,381,435 B2 | 7/2016 | Nakayama et al. | |
| D764,467 S | 8/2016 | Nokuo | |
| 9,436,338 B2 | 9/2016 | Keller et al. | |
| 9,474,975 B2 | 10/2016 | Shimizu | |
| D772,988 S | 11/2016 | Kujawski et al. | |
| 9,492,744 B2 | 11/2016 | Burgess et al. | |
| 9,501,218 B2 | 11/2016 | Hwang et al. | |
| 9,504,911 B2 | 11/2016 | Hackney | |
| 9,517,407 B2 | 12/2016 | Yasuda et al. | |
| 9,519,419 B2 | 12/2016 | Dickley et al. | |
| 9,526,986 B2 | 12/2016 | Tanaka et al. | |
| 9,526,987 B2 | 12/2016 | Horita et al. | |
| D777,260 S | 1/2017 | Burgess et al. | |
| 9,533,219 B2 | 1/2017 | Burgess et al. | |
| 9,550,116 B2 | 1/2017 | Burgess et al. | |
| D778,909 S | 2/2017 | Nokuo | |
| D780,180 S | 2/2017 | Ironmonger et al. | |
| D780,759 S | 3/2017 | Ironmonger et al. | |
| D780,760 S | 3/2017 | Ironmonger et al. | |
| 9,682,323 B2 | 6/2017 | Imai et al. | |
| 9,690,392 B2 | 6/2017 | Igarashi et al. | |
| 9,707,479 B2 | 7/2017 | Burgess et al. | |
| D794,027 S | 8/2017 | Ironmonger et al. | |
| 9,729,864 B2 | 8/2017 | Stafford | |
| 9,764,230 B2 | 9/2017 | Gassoway et al. | |
| 9,789,395 B2 | 10/2017 | Igarashi et al. | |
| 9,804,691 B1 | 10/2017 | Strahle et al. | |
| 9,811,172 B1 | 11/2017 | Strahle et al. | |
| 9,847,104 B2 | 12/2017 | Hirose et al. | |
| D810,202 S | 1/2018 | Foster et al. | |
| 9,861,898 B2 | 1/2018 | Miura et al. | |
| 9,878,238 B2 | 1/2018 | Burgess et al. | |
| 9,889,376 B2 | 2/2018 | Imai et al. | |
| 9,908,041 B2 | 3/2018 | Kujawski et al. | |
| 9,922,184 B2 | 3/2018 | Tokunaga et al. | |
| 9,971,401 B2 | 5/2018 | Stafford | |
| 9,971,420 B2 | 5/2018 | Strahle et al. | |
| 9,974,207 B2 | 5/2018 | Tsuchida | |
| 10,010,788 B2 | 7/2018 | Huang | |
| 10,028,007 B2 | 7/2018 | Arruika | |
| 10,029,175 B2 | 7/2018 | Burgess et al. | |
| 10,042,435 B2 | 8/2018 | Strahle et al. | |
| 10,061,397 B2 | 8/2018 | Strahle et al. | |
| D833,389 S | 11/2018 | Dunham et al. | |
| 10,120,438 B2 | 11/2018 | Osman et al. | |
| 10,124,249 B2 | 11/2018 | Schmitz et al. | |
| D835,036 S | 12/2018 | Dunham et al. | |
| 10,143,921 B1 | 12/2018 | Strahle | |
| 10,149,033 B2 | 12/2018 | Karacal | |
| 10,159,896 B2 | 12/2018 | Strahle et al. | |
| D839,356 S | 1/2019 | Sumii | |
| 10,183,218 B1 | 1/2019 | Strahle et al. | |
| 10,187,715 B2 | 1/2019 | Karacal | |
| 10,188,940 B2 | 1/2019 | Burgess et al. | |
| 10,191,714 B2 | 1/2019 | Wiggemans et al. | |
| 10,201,748 B2 | 2/2019 | Nakayama et al. | |
| 10,220,308 B2 | 3/2019 | Ironmonger et al. | |
| D845,395 S | 4/2019 | Strahle et al. | |
| D847,265 S | 4/2019 | Chatterjee et al. | |
| D847,903 S | 4/2019 | Chatterjee et al. | |
| D849,147 S | 4/2019 | Strahle et al. | |
| 10,251,292 B2 | 4/2019 | Araki et al. | |
| 10,272,327 B2 | 4/2019 | Strahle et al. | |
| 10,258,877 B2 | 5/2019 | Burgess et al. | |
| 10,279,250 B2 | 5/2019 | Burgess et al. | |

(56) References Cited

U.S. PATENT DOCUMENTS

| | | |
|---|---|---|
| 10,286,305 B2 | 5/2019 | Burgess et al. |
| D850,447 S | 6/2019 | Fulghum et al. |
| 10,318,230 B2 | 6/2019 | Watson et al. |
| D853,384 S | 7/2019 | Fulghum et al. |
| 10,335,674 B1 | 7/2019 | Trenado et al. |
| 10,348,108 B2 | 7/2019 | Hodges et al. |
| 10,350,490 B2 | 7/2019 | Ironmonger et al. |
| 10,406,431 B2 | 9/2019 | Campbell et al. |
| D864,302 S | 10/2019 | Strahle et al. |
| 10,427,035 B2 | 10/2019 | Schmitz et al. |
| 10,427,037 B2 | 10/2019 | Strahle et al. |
| D866,664 S | 11/2019 | Strahle et al. |
| D867,458 S | 11/2019 | Strahle et al. |
| 10,471,345 B1 | 11/2019 | Fuchs et al. |
| 10,475,606 B2 | 11/2019 | Scmitz |
| 10,477,711 B2 | 11/2019 | Araki et al. |
| 10,486,062 B2 | 11/2019 | Ikenoue et al. |
| D868,898 S | 12/2019 | Fei |
| 10,507,386 B2 | 12/2019 | Igarashi et al. |
| 10,516,724 B2 | 12/2019 | Takaichi et al. |
| D872,184 S | 1/2020 | Chatterjee et al. |
| 10,531,145 B2 | 1/2020 | Morita et al. |
| 10,532,284 B2 | 1/2020 | Stafford |
| 10,561,937 B2 | 2/2020 | Strahle et al. |
| 10,569,162 B2 | 2/2020 | Strahle et al. |
| 10,576,386 B2 | 3/2020 | Ironmonger et al. |
| 10,594,936 B2 | 3/2020 | Nakamura et al. |
| 10,596,464 B2 | 3/2020 | Doucet et al. |
| 10,603,576 B2 | 3/2020 | Igarashi et al. |
| D881,281 S | 4/2020 | Tong |
| 10,610,778 B2 | 4/2020 | Nakayama et al. |
| 10,628,113 B2 | 4/2020 | Ogiso et al. |
| D885,387 S | 5/2020 | Hu |
| 10,639,543 B2 | 5/2020 | Campbell et al. |
| D888,832 S | 6/2020 | Tong |
| 10,671,184 B2 | 6/2020 | Kim |
| D890,846 S | 7/2020 | Fulghum et al. |
| 10,712,575 B2 | 7/2020 | Doucet et al. |
| 10,722,786 B2 | 7/2020 | Bellinghausen et al. |
| 10,737,171 B2 | 8/2020 | Strahle et al. |
| 10,750,631 B2 | 8/2020 | Araki et al. |
| 10,758,814 B2 | 9/2020 | Trenado et al. |
| 10,765,937 B2 | 9/2020 | Igarashi et al. |
| 10,835,812 B2 | 11/2020 | Gassoway et al. |
| D906,430 S | 12/2020 | Feng |
| 10,850,192 B2 | 12/2020 | Machida et al. |
| 10,874,936 B2 | 12/2020 | Higgins et al. |
| 10,874,938 B2 | 12/2020 | Strahle et al. |
| D907,119 S | 1/2021 | Zhou |
| D908,800 S | 1/2021 | Tang |
| 10,888,772 B2 | 1/2021 | Ikenoue et al. |
| D909,487 S | 2/2021 | Whitaker et al. |
| D912,734 S | 3/2021 | Yang |
| 10,940,385 B2 | 3/2021 | Black et al. |
| 10,942,584 B2 | 3/2021 | Strahle et al. |
| D917,622 S | 4/2021 | Hsu et al. |
| 10,967,254 B2 | 4/2021 | Black et al. |
| 10,967,262 B2 | 4/2021 | Imai et al. |
| 10,974,148 B2 | 4/2021 | Ikenoue et al. |
| D921,116 S | 6/2021 | Zhou |
| 11,033,816 B2 | 6/2021 | Takaichi et al. |
| 11,047,925 B2 | 6/2021 | Black |
| D924,977 S | 7/2021 | Saito |
| 11,065,533 B2 | 7/2021 | Gary |
| D926,887 S | 8/2021 | Yang |
| D928,234 S | 8/2021 | Hsu et al. |
| 11,093,114 B2 | 8/2021 | Yamamoto et al. |
| 11,103,774 B2 | 8/2021 | Black et al. |
| D932,552 S | 10/2021 | Morisawa |
| D932,553 S | 10/2021 | Morisawa |
| D932,554 S | 10/2021 | Tong |
| D933,750 S | 10/2021 | Kobayashi et al. |
| D933,751 S | 10/2021 | Kobayashi et al. |
| D934,344 S | 10/2021 | Hsu et al. |
| D934,345 S | 10/2021 | Morimoto et al. |
| 11,154,778 B2 | 10/2021 | Doucet et al. |
| D936,146 S | 11/2021 | Hsu et al. |
| D936,149 S | 11/2021 | Morisawa |
| 11,173,393 B2 | 11/2021 | Nakagawa et al. |
| D940,244 S | 1/2022 | Zhou |
| D947,948 S | 4/2022 | Ma et al. |
| 11,298,610 B2 | 4/2022 | Orion et al. |
| 11,429,187 B2 | 8/2022 | Ishikawa et al. |
| D963,650 S | 9/2022 | Qin |
| D963,751 S | 9/2022 | Chatterjee et al. |
| D963,752 S | 9/2022 | Chatterjee et al. |
| 11,511,185 B2 | 11/2022 | Nakagawa et al. |
| 11,511,186 B2 | 11/2022 | VanWyk et al. |
| 11,524,227 B1 | 12/2022 | Lee |
| D976,325 S | 1/2023 | Fuchs et al. |
| D983,269 S | 4/2023 | Daddar et al. |
| 11,654,353 B2 | 5/2023 | Machida et al. |
| D1,002,732 S | 10/2023 | Young et al. |
| 11,794,098 B2 | 10/2023 | Schmitz et al. |
| 11,806,613 B2 | 11/2023 | Burgess et al. |
| D1,007,591 S | 12/2023 | Wu |
| D1,012,197 S | 1/2024 | Chatterjee et al. |
| 2005/0083297 A1 | 4/2005 | Duncan |
| 2006/0025217 A1 | 2/2006 | Hussaini et al. |
| 2006/0040740 A1* | 2/2006 | DiDato .................. A63F 13/42 463/7 |
| 2007/0078002 A1 | 4/2007 | Evans et al. |
| 2009/0146958 A1 | 6/2009 | Ikeda et al. |
| 2009/0233710 A1 | 9/2009 | Roberts |
| 2010/0041480 A1* | 2/2010 | Wong ................... A63F 13/22 463/37 |
| 2010/0178984 A1 | 7/2010 | Lum et al. |
| 2010/0222146 A1 | 9/2010 | Evans et al. |
| 2010/0245249 A1 | 9/2010 | Ng |
| 2012/0007822 A1* | 1/2012 | Luo ................... G06F 3/03547 345/173 |
| 2012/0034978 A1* | 2/2012 | Lim .................. A63F 13/335 463/36 |
| 2013/0012319 A1* | 1/2013 | Negroponte ........... A63F 13/92 463/37 |
| 2013/0053146 A1 | 2/2013 | Ikeda et al. |
| 2013/0100021 A1* | 4/2013 | Larsen ................ A63F 13/214 345/161 |
| 2013/0215081 A1* | 8/2013 | Levin ................... G06F 1/1626 345/173 |
| 2014/0078086 A1* | 3/2014 | Bledsoe ............. G06F 3/03547 345/173 |
| 2015/0105152 A1* | 4/2015 | Bellinghausen .... A63F 13/2145 463/31 |
| 2016/0082349 A1 | 3/2016 | Burgess et al. |
| 2016/0232675 A1 | 8/2016 | Ogasawara et al. |
| 2016/0296837 A1 | 10/2016 | Burgess et al. |
| 2016/0317921 A1 | 11/2016 | Schmitz et al. |
| 2016/0317925 A1 | 11/2016 | Miller |
| 2016/0346682 A1 | 12/2016 | Burgess et al. |
| 2016/0361639 A1 | 12/2016 | Schmitz et al. |
| 2017/0189800 A1* | 7/2017 | Crain ..................... A63F 13/24 |
| 2018/0345134 A1 | 12/2018 | Schmitz et al. |
| 2019/0291000 A1 | 9/2019 | Campbell et al. |
| 2020/0338445 A1 | 10/2020 | Zhao et al. |
| 2020/0353349 A1 | 11/2020 | Palmer et al. |
| 2022/0305375 A1 | 9/2022 | Morita et al. |
| 2023/0071216 A1 | 3/2023 | Samperi |
| 2023/0133332 A1 | 5/2023 | Samperi |
| 2023/0233948 A1 | 7/2023 | Ironmonger et al. |
| 2023/0285849 A1 | 9/2023 | Burgess et al. |

FOREIGN PATENT DOCUMENTS

| | | |
|---|---|---|
| CN | 11271465 A | 4/2021 |
| CN | 112714665 A | 4/2021 |
| EP | 3742260 A1 | 11/2020 |
| GB | 2419174 A | 4/2006 |
| JP | 2018010639 A | 1/2018 |
| JP | 3217436 U | 8/2018 |
| JP | 6730918 B2 | 7/2020 |
| KR | 10 2017 131237 | 10/2017 |
| KR | 20170131237 A | 11/2017 |

(56) References Cited

FOREIGN PATENT DOCUMENTS

| | | |
|---|---|---|
| KR | 20220004662 A | 1/2022 |
| KR | 20220022121 A | 2/2022 |
| WO | WO 2000068930 A1 | 11/2000 |
| WO | WO 2007040499 A1 | 4/2007 |
| WO | WO2016178787 | 11/2016 |
| WO | WO 2017150128 A1 | 8/2017 |
| WO | WO 2020235614 A1 | 11/2020 |
| WO | WO 202054824 A1 | 12/2020 |
| WO | WO 2023178564 A1 | 9/2023 |

OTHER PUBLICATIONS

Finger Stylus Ring, https://www.amazon.com/Dust-plug-Keychain-Capacitive-Touchscreens-designed/dp/B0081UJ520, downloaded on Mar. 6, 2024.

Peripheral Vision Turbo Touch 360 https://www.thevintagegamers.com/2013/10/peripheral-vision-turbo-touch-360-for-the-nes/ downloaded Mar. 6, 2024, Copyright 2010-2024 The Vintage Gamer.

Project by Stempedia "DIY Touch based Controller",Copyright 2024—Agilo Research https://ai.thestempedia.com/project/diy-touch-based-controller/, downloaded Mar. 6, 2024.

Benchoff, Brian, "Making a Game with Capacitive Touch", published on https://hackaday.com/2012/08/08/making-a-game-with-capacitive-touch/ Aug. 8, 2012, downloaded Mar. 6, 2024.

Wikipedia—Turbo Touch 360, Retrieved from "https://en.wikipedia.org/w/index.php?title=Turbo_Touch_360&oldid=1151088518" on Mar. 6, 2024.

Microsoft Xbox Elite One Game Controller Product Information from the www.xbox.com website, published in 2016, pp. 1-11 and downloaded on Jan. 7, 2017.

Sony DualShock PS4 Fame Controller Product Information from the www.playstation.com website, published in 2015, pp. 1-4, and downloaded on Jan. 7, 2017.

"Sony Announces 2 Licensed 'Elite' PS4 Controllers From Raser, Naon", by Ken Salcedo, www.ibtimes.com website, published Oct. 26, 2016, 3 pages, downloaded Jan. 7, 2017.

Razer Raijugame Controller Product Information from the www.razerzone.com website, published in 2016, pp. 1-12, downloaded on Jan. 7, 2017.

Nacon Revoluation Game Controller Product Information from the www.nacongamin.com website, published in 2016, pp. 1-12, downloaded Jan. 7, 2017.

"How to make the most of the Steam Controller: A comprehensive guide," by Kevin Connolly, www.pcgamer.com website, Apr. 15, 2016, pp. 1-5, downloaded Jan. 7, 2017.

"New DualShock 4 Controller Patented by Sony," from www.neogaf.com website, published on Jun. 19, 2016, pp. 1-7, downloaded Jan. 7, 2017.

Prosecution history from U.S. Appl. No. 15/415,728, filed Jan. 25, 2017 including: Notice of Allowance and Fee(s) Due mailed Nov. 6, 2019, Advisory Action mailed Sep. 27, 2019, Final Rejection mailed Jul. 19, 2019, Non-Final Rejection mailed Feb. 21, 2019, and Restriction Requirement mailed Jan. 22, 2019.

Prosecution history from U.S. Appl. No. 16/681,059, filed Nov. 12, 2019 including: Notice of Allowance and Fee(s) Due mailed Oct. 8, 2021, Notice of Allowance and Fee(s) Due mailed Sep. 22, 2021, and Non-Final Rejection mailed Apr. 23, 2021.

"Introducing DualSense, the New Wireless Game Controller for PlayStation 5," published on Apr. 7, 2020, retrieved from https://blog.playstation.com/2020/04/07/introducing-dualsense-the-new-wi, on Mar. 8, 2024.

"DualSense wireless controller | The innovative new controller for PS5 | PlayStation," retrieved from https://www.playstation.com/en-us/accessories/dualsense-wireless-controller/, on Mar. 8, 2024.

"PDP Victrix Gambit World's Fastest Licensed Xbox Controller, Elite Esports Design Xbox One, Series X|S, Windows 10 White & Purple 049-006-NA—Best Buy," retrieved from https://www.bestbuy.com/site/pdp-victrix-gambit-worlds-fastest-licensed-xbox-controller-elite-esports-design-xbox-one-series-xs-windows-10-white-purple/6481522.p?skuId=6481522 on Mar. 8, 2024.

Will Greenwald, "Victrix Gambit Dual Core Tournament Controller Review | PCMag," Dec. 6, 2021, retrieved from https://www.pcmag.com/reviews/victrix-gambit-dual-core-tournament-controller, on Mar. 8, 2024.

Mega Modz Staff, "Victrix Gambit Review: World's Fastest Tournament Pro Controller | Mega Modz Blog, Victrix Gambit Dual Core GamingController Review: UnmatchedEsport Performance," published on Jul. 7, 2023, retrieved from https://megamodz.com/blog/PDP-Victrix-Gambit-Xbox-Controller-Review, on Mar. 8, 2024.

\* cited by examiner

GAME CONTROLLER

CROSS REFERENCE TO RELATED APPLICATION(S)

This Application is a Continuation-In-Part of U.S. patent application Ser. No. 16/681,059 entitled Game Controller filed Nov. 12, 2019 which has been allowed, which is a Continuation Application of U.S. patent application Ser. No. 15/415,728 entitled Game Control filed Jan. 25, 2017, which matured and issued as U.S. Pat. No. 10,507,385 B2 on Dec. 17, 2019. This Application also claims the benefit of U.S. Provisional Patent Application No. 63/117,674 entitled Game Controller filed on Nov. 24, 2020, and the benefit of Provisional Patent Application No. 63/125,548 entitled Game Controller filed on Dec. 15, 2020. The contents of all the applications cited in the CROSS REFERENCE TO RELATED APPLICATION(S) section are incorporated by reference in their entireties.

FIELD

The invention relates to game controllers for controlling the play of computerized games, more particularly, but not exclusively, the invention relates to ergonomics and a control system which can be programmed and customized.

BACKGROUND OF THE INVENTION

Many different types of gaming consoles and game controllers are presently available for operating video games. For example, the Sony Corporation has made the Playstation® gaming console, and the DualShock® 1-4 game controllers, and has been granted U.S. Pat. No. 5,716,274, by Goto et al., U.S. Pat. No. 8,613,665 B2 by Goto et al., U.S. Pat. No. 9,116,555 B2 by Nakayama et al., U.S. Pat. No. 9,174,122 B2 by Miyakazi, U.S. Pat. No. 9,381,435 B2 by Nakayama et al., U.S. D572,254 S by Goto, and U.S. D715,296 S by Huang for game controllers, all of these patents are hereby incorporated by reference herein. U.S. D715,296 S by Huang closely corresponds to the Sony® PS4 game controller. The Razer Raiju Gaming Controller and Nacon Revolution Pro Controller are also two officially licensed controllers for the Sony® PS4 in 2016. The Microsoft Corporation has made the Xbox® gaming console and the Xbox® Duke game controller, the Xbox 360® game console and controllers, and most recently the Xbox One® game console and controller and also the Xbox One Elite® game controller, and has been granted U.S. Pat. No. 8,409,002 B2 by Evans et al., U.S. Pat. No. 8,727,882 B2 by Lum et al., U.S. Pat. No. 9,029,721 B2 by Ikeda et al., U.S. Pat. No. 9,251,701 B2 by Plagge et al., U.S. Pat. No. 9,227,141 B2 by Mays Ill et al., U.S. D709,882 S by Morris et al., U.S. D772,988 S by Kujawski et al., and has also filed published U.S. patent applications US20130053146 A1 by Ikeda et al., but also US20160361639 A1 by Schmitz et al., U.S. 20160317925 A1 by Miller, US20100222146 A1 by Evans et al., US20100178984 A1 by Lum et al., US20090146958 A1 by Ikeda et al., and US20070078002 A1 by Evans et al., all of these patents and patent applications are hereby incorporated by reference herein, U.S. D709,882 S by Morris et al. closely corresponds to the Xbox One® game controller, and U.S. D772,988 S by Kujawski et al. closely corresponds to the Xbox One Elite® game controller. Nintendo® has made the Nintendo Entertainment System®, the Super Nintendo Entertainment System®, Nintendo 64®, Nintendo GameCube®, and the Wii® and the Wii U® gaming consoles and each console's respective controllers, and has also been granted U.S. Pat. No. 6,489,946 B1 by Takeda et al., U.S. Pat. No. 8,715,080 B2 by Yasuda et al., U.S. Pat. No. 8,749,489 B2 by Ito et al., U.S. Pat. No. 9,517,407 B2 by Yasuda et al., U.S. Pat. No. 9,526,986 B2 by Tanaka et al., U.S. Pat. No. 9,526,987 B2 by Horita et al., and has also filed for published U.S. patent application US20160232675 A1, all of these patents and this patent application are hereby incorporated by reference herein. There are also many other designers and/or manufacturers of game controllers which are compatible with different gaming consoles and systems and some of these are also associated with patents such as U.S. Pat. No. 9,005,025 B2 by Joynes et al. assigned to Wikipad, Inc., U.S. Pat. No. 9,504,911 B2 by Hackney assigned to Cinch Gaming Equipment LLC, and U.S. D608,784 S by Biheller, assigned to Dreamgear LLC, all of these patents are hereby incorporated by reference herein. In particular, Scuf Gaming International LLC has commercialized game controllers including paddle controls and is associated with numerous patents and patent applications by Burgess et al. assigned to Ironburg Inventions Ltd. including U.S. Pat. No. 8,480,491 B2, U.S. Pat. No. 8,641,525 B2, U.S. Pat. No. 9,089,770 B2, U.S. Pat. No. 9,289,688 B2, U.S. Pat. No. 9,308,450 B2, U.S. Pat. No. 9,308,451 B2, U.S. Pat. No. 9,352,229 B2. U.S. Pat. No. 9,492,744 B2, U.S. D667,892 S, U.S. D721,139 S, U.S. D728,030 S, U.S. D730,451 S, U.S. D733,802 S, U.S. D748,734 S, and published U.S. patent applications US20160082349 A1, U.S. 20160296837 A1, and US20160346682 A1, all of these patents and patent applications are hereby incorporated by reference herein. The Microsoft Corporation licensed some of the patents of Scuf Gaming International LLC and/or Ironburg Inventions Ltd. to commercialize the Microsoft Xbox One Elite® game controller.

SUMMARY

A first aspect of the present invention provides a hand held game controller comprising: a case comprising a top side, a bottom side, a front side, a rear side, a left side, a left shoulder portion, a left handle portion, a right side, a right shoulder portion, a right handle portion, and a middle portion; comprising at least two controls on each of said left shoulder portion and said right shoulder portion.

Optionally, the at least two controls comprise electrically resistive pressure sensitive touch controls.

Optionally, the electrically resistive pressure sensitive touch controls can each be configured to initiate a command with an applied force in the range between 10-50 grams when measured pursuant to ASTM 1578.

Optionally, the electrically resistive pressure sensitive touch controls can each be configured to initiate a command with an applied force in the range between 15-30 grams when measured pursuant to ASTM 1578.

Optionally, the at least two controls comprise capacitive controls.

Optionally, the capacitive controls can be configured to initiate a command when the distance of a user's finger is in the range between and including direct contact of said finger of said user and a distance of said finger equal to or less than ¼ inch or 6.35 mm from said capacitive controls.

Optionally, the capacitive controls can be configured to initiate a command when the distance of a user's finger is in the range between and including direct contact of said finger of said user and a distance of said finger equal to or less than ⅛ths inch or 3.175 mm from said capacitive controls.

Optionally, the at least two controls comprise at least one electrically resistive pressure sensitive touch control and at least one capacitive control.

Optionally, the at least one electrically resistive pressure sensitive touch control can be configured to initiate a command with an applied force in the range between 10-50 grams when measured pursuant to ASTM 1578.

Optionally, the at least one electrically resistive pressure sensitive touch control can be configured to initiate a command with an applied force in the range between 15-30 grams when measured pursuant to ASTM 1578.

Optionally, the at least one capacitive control can be configured to initiate a command when the distance of a user's finger is in the range between and including direct contact of said finger of said user and a distance of said finger equal to or less than ¼ inch or 6.35 mm from said at least one capacitive control.

Optionally, the at least one capacitive control can be configured to initiate a command when the distance of a user's finger is in the range between and including direct contact of said finger of said user and a distance of said finger equal to or less than ⅛ths inch or 3.175 mm from said at least one capacitive control.

Optionally, the middle portion comprises at least one touch pad control on said top side.

Optionally, the middle portion comprises at least two controls on said bottom side.

Optionally, the at least two controls on said bottom side comprise paddle controls.

Optionally, the at least two controls on said bottom side comprise push-button key controls.

Optionally, the at least two controls on said bottom side comprise at least one touch pad control.

Optionally, the at least one touch pad control distinguishes the touch of multiple independent fingers.

Optionally, the left handle portion and the right handle portion each comprise at least one customizable and removable grip portion.

Optionally, the game controller comprises at least one control comprising a normally closed switch which connects a first closed electrical circuit to ground in the resting position, but which removes the connection to ground and permits electrical energy to flow in a second closed electric circuit when the control is actuated by a user.

Optionally, the game controller comprises at least two thumbstick controls.

Optionally, the game controller comprises two thumbstick controls located on said top side of said case and arranged in a symmetrical configuration relative to said left handle portion, said middle portion, and said right handle portion.

Optionally, the game controller comprises two thumbstick controls located on said top side of said case and arranged in an asymmetrical configuration relative to said left handle portion, said middle portion, and said right handle portion.

Optionally, the thumbsticks further comprise a push button control.

Optionally, the case comprises a receptacle for receiving and a retaining ring for securing at least one removably attachable gate comprising a geometric shape for customizing the play of at least one control.

Optionally, the gate comprises a geometric shape selected from the group of geometric shapes consisting of: a circular shape, an octagonal shape, a square shape, and a diamond shape.

Optionally, the game controller further comprises a plurality of other additional individual controls selected from the group consisting of: an on/off control, a keyboard control, a master control, a menu control, a control remapping control, a camera control, a chat control, at least one shift control, at least one bumper control, at least one trigger control, at least one hair trigger lock control, at least one sensitivity control, at least one cross-shaped directional control, at least one paddle control, at least one push button control, at least one touch screen control, at least one touch pad control, at least one joystick control, at least one thumbstick control, and, at least one action button control.

Optionally, the game controller comprising means for communication with at least one of a game console and a game platform, said means for communication selected from the group consisting of: a wire cable connection, a fiber optic cable connection, and a wireless connection.

A second aspect of the present invention provides a hand held game controller comprising:

a case comprising a top side, a bottom side, a front side, a rear side, a left side, a left shoulder portion, a left handle portion, a right side, a right shoulder portion, a right handle portion, and a middle portion; said left handle portion comprising a first customizable and removable grip portion on said left side, and said right handle portion comprising a second customizable and removable grip portion on said right side for accommodating different users having small, medial, and large hands.

A third aspect of the present invention provides a hand held game controller comprising: a case comprising a top side, a bottom side, a front side, a rear side, a left side, a left shoulder portion, a left handle portion, a right side, a right shoulder portion, a right handle portion, and a middle portion; comprising a removable gate comprising a geometric shape for customizing the play of at least one control.

Optionally, the gate comprises a geometric shape selected from the group consisting of: a circular shape, an octagonal shape, a square shape, and a diamond shape.

A fourth aspect of the present invention provides a hand held game controller comprising: a case comprising a top side, a bottom side, a front side, a rear side, a left side, a left shoulder portion, a left handle portion, a right side, a right shoulder portion, a right handle portion, and a middle portion; and at least one control comprising a normally closed switch which connects a first closed electrical circuit to ground in the resting position, but which breaks the connection to the circuit to ground and permits electrical energy to flow in the second closed electric circuit when said control is actuated by a user.

A fifth aspect of the present invention provides a hand held game controller comprising a plurality of controls, wherein a majority of said plurality of controls are touch controls.

A sixth aspect of the present invention provides a hand held game controller comprising a plurality of controls, wherein a majority of said plurality of controls are capacitive controls.

Optionally, the game controller comprises a case comprising a top side, a bottom side, a front side, a rear side, a left side, a left shoulder portion, a left handle portion, a right side, a right shoulder portion, a right handle portion, and a middle portion.

Optionally, the game controller comprises a plurality of other additional controls selected from the group consisting of: an on/off control, a keyboard control, a master control, a menu control, a control remapping control, a camera control, a chat control, at least one shift control, at least one bumper control, at least one trigger control, at least one hair trigger lock control, at least one sensitivity control, at least one cross-shaped directional control, at least one paddle control, at least one push button control, at least one touch screen control, at least one touch pad control, at least one joystick control, at least one thumbstick control, and, at least one action button control.

BRIEF DESCRIPTION OF THE DRAWINGS

Aspects of the invention are described in detail below with reference to the attached drawing figures, wherein.

DETAILED DESCRIPTION

Figure 1:
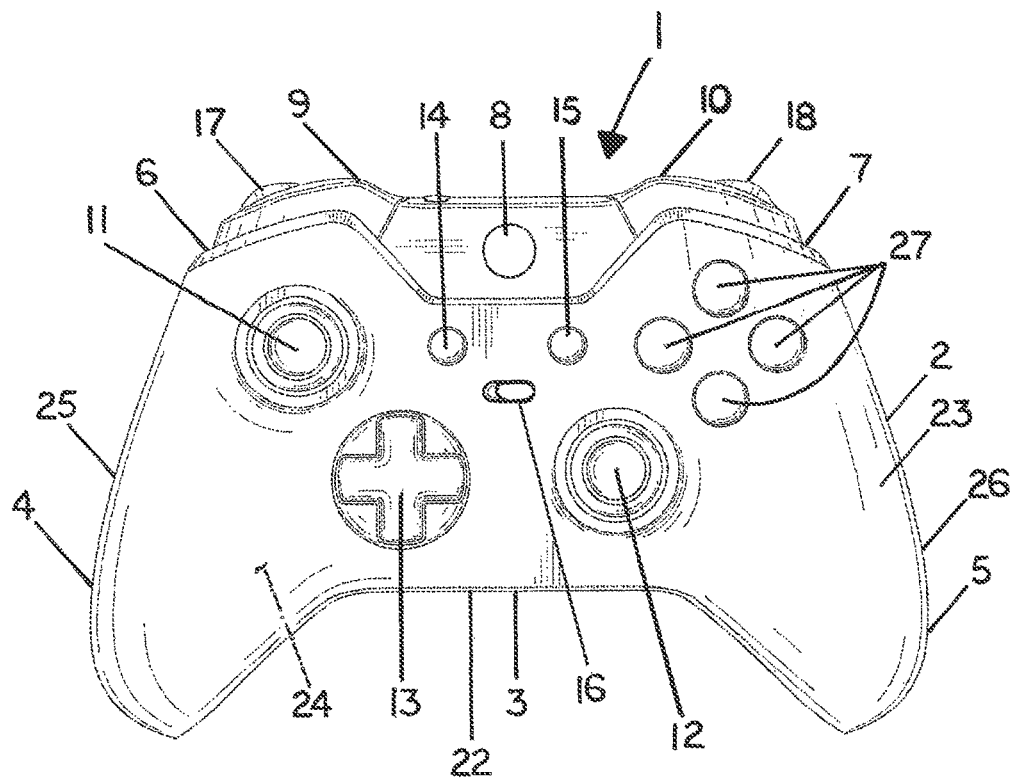
FIG. 1 is a top view of a game controller according to one embodiment having asymmetrical placement of thumbstick controls.

Detailed descriptions of specific embodiments of the game controller and its actuator mechanisms and other features are disclosed herein. It can be readily understood that the disclosed embodiments are merely examples of the way in which certain aspects of the invention can be implemented and do not represent all of the ways the invention may be embodied. The game controller and its actuator mechanisms and other features described herein may be embodied in various alternative forms. Further, the drawing figures are not necessarily to scale and some features may be enlarged or minimalized to show certain details and features of particular embodiments. Some well-known structures, components, features, materials, and methods are not necessarily described in great detail for the sake of brevity and in order to focus upon the present invention. Any specific structural and functional details disclosed herein are not to be interpreted as limiting, but rather are provided for teaching one skilled in the art to variously employ the invention, and as basis for the claims.

FIG. 1 is a top view of a game controller 1 according to one embodiment including a left thumbstick control 11 and a right thumbstick control 12 located asymmetrically relative to the left handle portion 4, the middle portion 3, and the right handle portion 5 of the game controller 1 similar to the Microsoft Xbox One® game controller which is believed to be represented in U.S. D709,882 S by Morris et al. The embodiment of a game controller 1 shown in FIG. 1 includes a case 2 having a front side 21, back side 22, top side 23, bottom side 24, left side 25, right side 26, left shoulder portion 6, a right shoulder portion 7, a middle portion 3, a left handle portion 4, and a right handle portion 5. As shown, the top view of the controller 1 shows an on and off control 8, a left selection control 14 which can be used as a back control switch and for other functions, a right selection control 15 which can be used as a menu control switch and for other functions, a mapping preset control 16 for changing between a plurality of mapping presets, a left trigger control 9 and a left bumper control 17 on the left shoulder portion 6, a right trigger control 10 and a right bumper control on the right shoulder portion 7, four action controls 27 which can be labeled A. B. X, and Y, and a cross-shaped directional pad control 13. Other mechanical controllers and switches for possible use in a game controller can be push button, slide, rocking, rotating, throwing, pulling, key-turning, magnetic, and toggle actuated.

Figure 2:
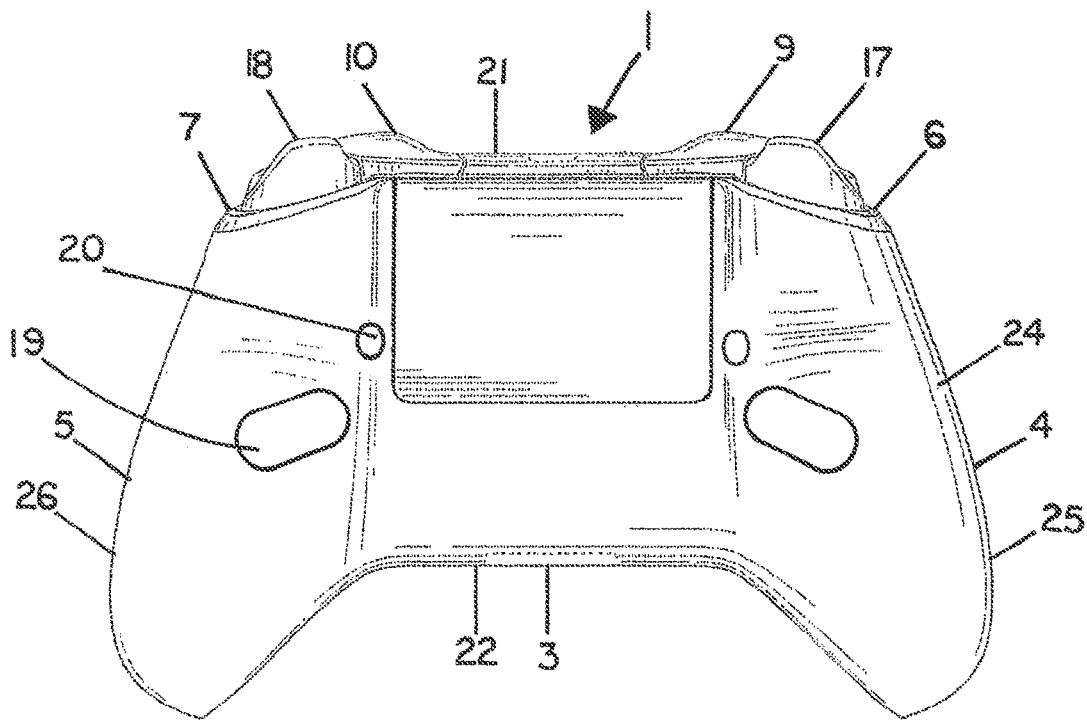
FIG. 2 is a bottom view of the game controller shown in FIG. 1 showing paddle controls on the left and right handle portions of the game controller.

FIG. 2 is a bottom view of the game controller 1 shown in FIG. 1. Unlike, the Microsoft Xbox One® and Microsoft Xbox One Elite® game controllers which are believed to be represented in U.S. D709,882 S by Morris et al. and U.S. D772,988 S by Kujawski et al., the embodiment which is shown in FIG. 1 includes paddle controls 19 which are secured on the left handle portion 4, and also the right handle portion 5 of the game controller 1. The game controller 1 shown in FIG. 2 also includes a left bumper control 17 and left trigger control 9 on the left shoulder portion 6, a right bumper control 18 and a right trigger control 10 on the right shoulder portion 7, and two hair trigger lock controls 20.

Figure 3:
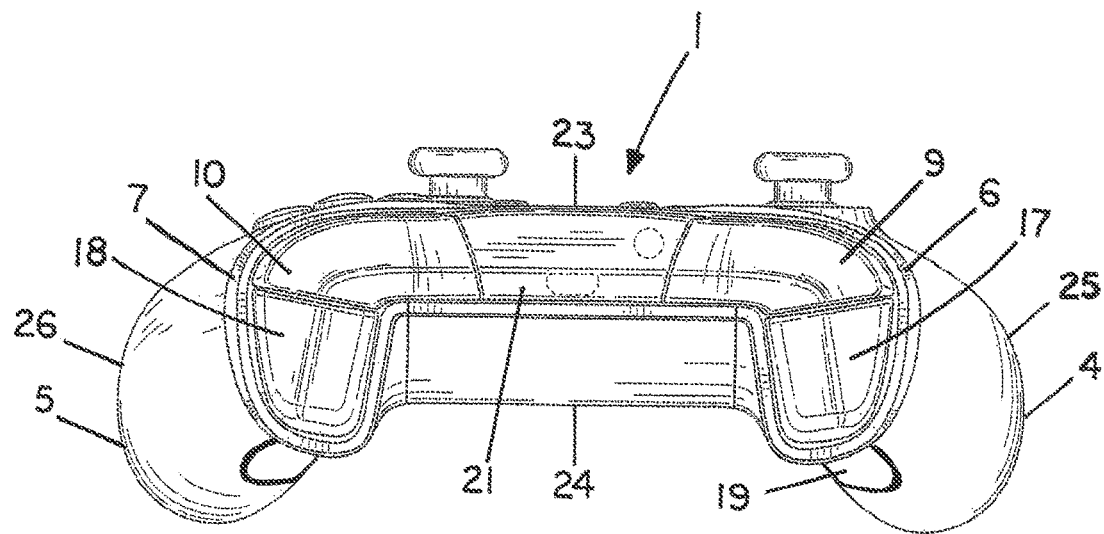
FIG. 3 is a front view of the game controller shown in FIG. 1.

FIG. 3 is a front view of the game controller 1 shown in FIG. 1 showing a left trigger control 9 and a left bumper control 17 on the left shoulder portion 6, and a right trigger control 10 and a right bumper control 18 on the right shoulder portion 7 of the game controller 1, and a portion of the two paddle controls 19 can also be seen.

Figure 4:
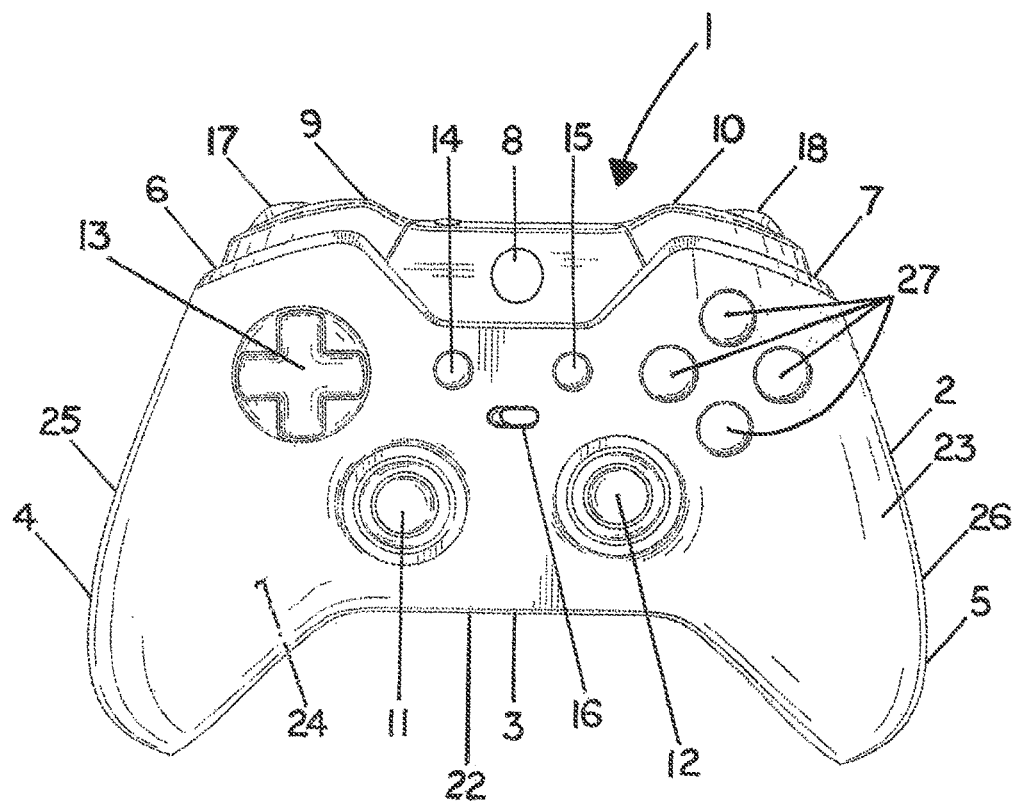
FIG. 4 is a top view of a game controller according to one embodiment generally similar to that shown in FIG. 1, but having a symmetrical placement of thumbstick controls on the top side.

FIG. 4 is a top view of a game controller 1 according to one embodiment which is generally similar to that shown in FIG. 1, but having a symmetrical placement of the left thumbstick control 11 and right thumbstick control 12 on the top side 23.

Figure 5:
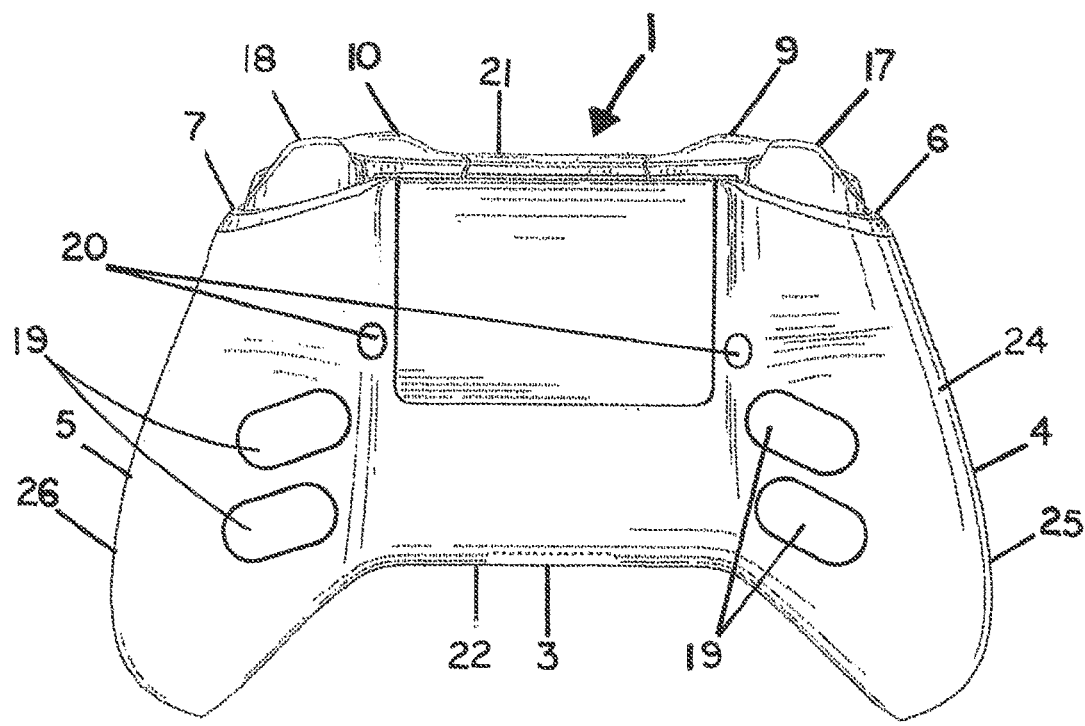
FIG. 5 is a bottom view of a game controller according to one embodiment similar to that shown in FIG. 2, but including two paddle controls on each of the left and right handle portions of the game controller.

FIG. 5 is a bottom view of a game controller 1 according to one embodiment that is generally similar to that shown in FIG. 2, but which includes two paddle controls 19 on the left handle portion 4 and two paddle controls 19 on the right handle portion 5 of the game controller 1. It can be readily understood that users normally have five fingers on their hands including the thumb. Counting the thumb as the first finger, the index finger is the second finger, the middle finger is the third finger, and the fourth finger, and then the fifth finger which is normally the smallest. The paddle controls 19 can be actuated by a user's third or middle finger and also a user's fourth and fifth fingers.

Figure 6:
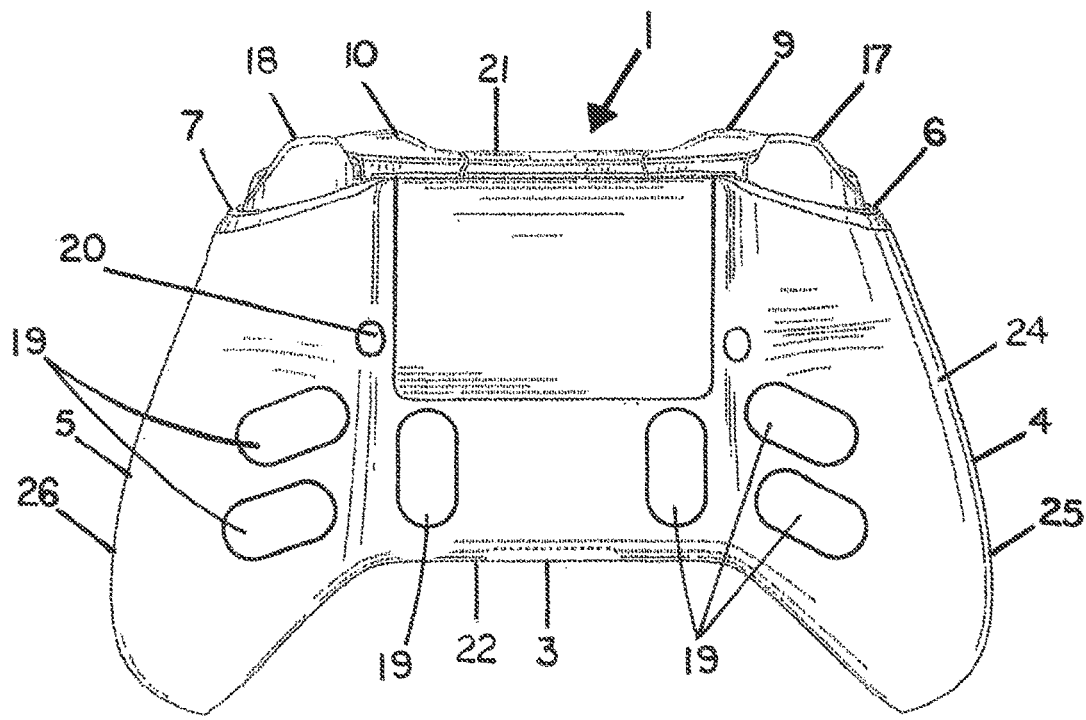
FIG. 6 is a bottom view of a game controller according to one embodiment similar to that shown in FIG. 5, but further including two paddle controls on the middle portion of the game controller.

FIG. 6 is a bottom view of a game controller 1 according to one embodiment that is generally similar to that shown in FIG. 5, but which further includes two controls on the middle portion 3 of the game controller 1. The two controls can be a toggle or paddle controls, and other mechanical controllers and switches for possible use in a game controller can be push button, slide, rocking, rotating, throwing, pulling, key-turning, and magnetic actuated.

Figure 7:
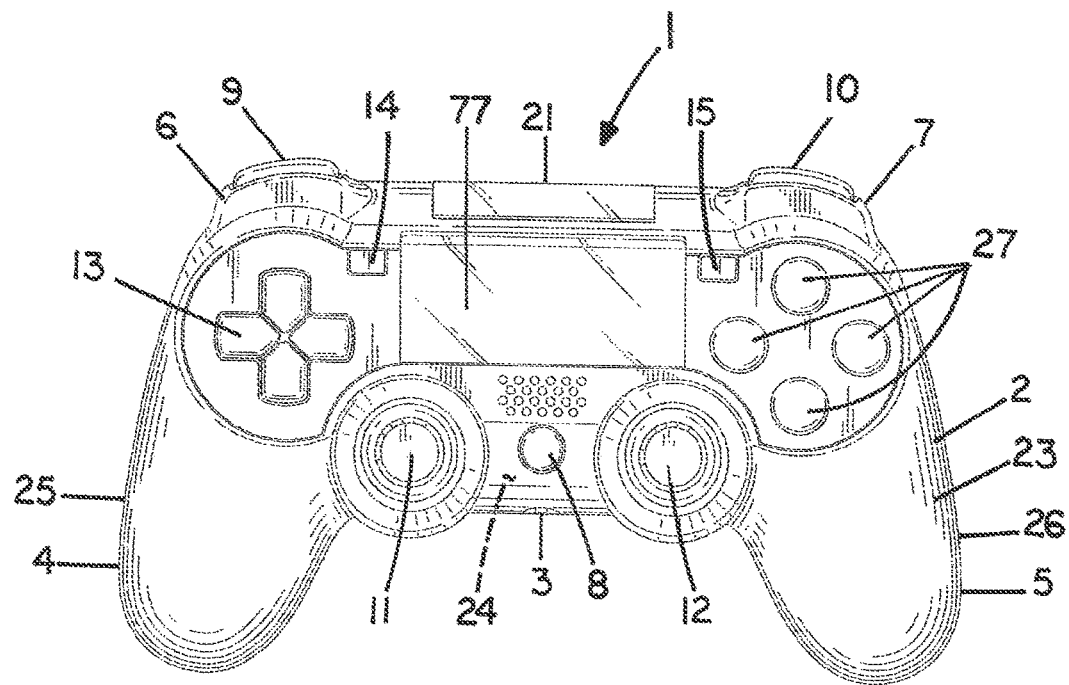
FIG. 7 is a top view of a game controller according to one embodiment having symmetrical placement of thumbstick controls on the top side.

FIG. 7 is a top view of a game controller 1 according to one embodiment which has a left thumbstick control 11 and a right thumbstick control 12 located symmetrically relative to the left handle portion 4, the middle portion 3, and the right handle portion 5 of the game controller 1 on the top side 23 similar to the Sony® PS4 game controller which is believed to be represented in U.S. D715,296 S by Huang. The game controller 1 shown in FIG. 7 includes a case 2 having a front side 21, back side 22, top side 23, bottom side 24, left side 25, right side 26, a left shoulder portion 6, a right shoulder portion 7, a middle portion 3, a left handle portion 4, and a right handle portion 5. As shown, the top view of the controller 1 shows an on and off control 8, a left selection control 14 which can be used as a back control and for other functions, a right selection control 15 which can be used as a menu control and for other functions, a control 16 for changing between mapping presets, a left trigger control 9 on the left shoulder portion 6, a right trigger control 10 on the right shoulder portion 7, four action controls 27 which can be labeled A, B. X, and Y, a cross-shaped directional pad control 13, and a touch control screen 77.

Figure 8:
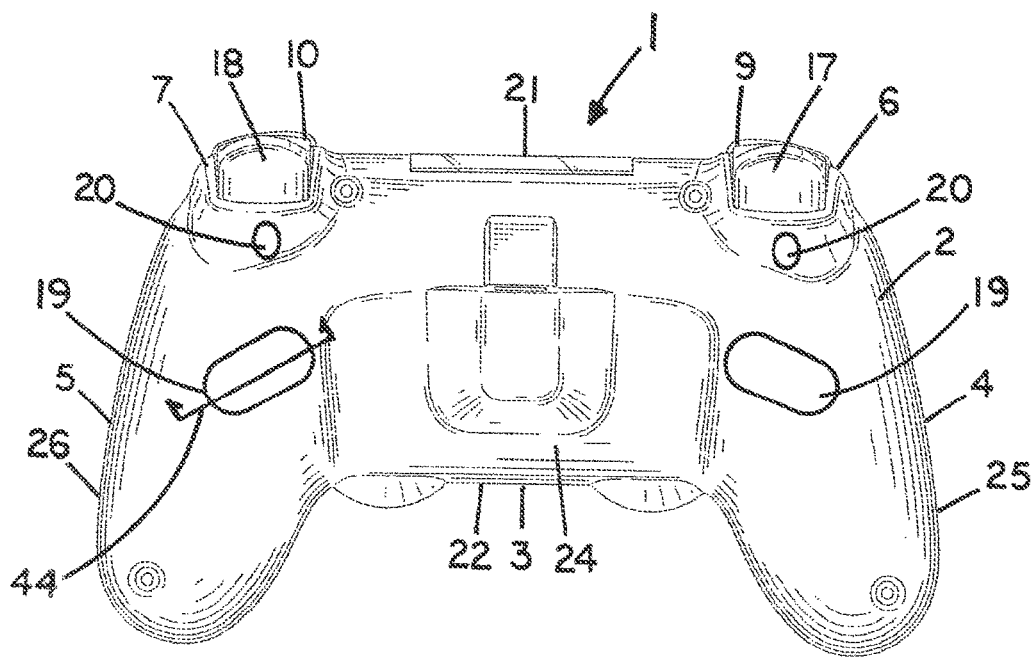
FIG. 8 is a bottom view of the game controller shown in FIG. 7 showing paddle controls on the left and right handle portions of the game controller.

FIG. 8 is a bottom plan view of the game controller 1 shown in FIG. 7, but which includes a paddle control 19 on the left handle portion 4 and a paddle control 19 on the right handle portion 5 of the game controller 1. Unlike, the Microsoft Xbox One® and Microsoft Xbox One Elite® game controllers which are believed to be represented in U.S. D709,882 S by Morris et al. and U.S. D772,988 S by Kujawski et al., the embodiment which is shown in FIG. 7 includes paddle controls 19 which are secured on the left handle portion 4, and also the right handle portion 5 of the game controller 1. The game controller 1 shown in FIG. 8 also includes a left bumper control 17 and left trigger control 9 on the left shoulder portion 6, a right bumper control 18 and a right trigger control 10 on the right shoulder portion 7, and two hair trigger lock controls 20.

Figure 9:
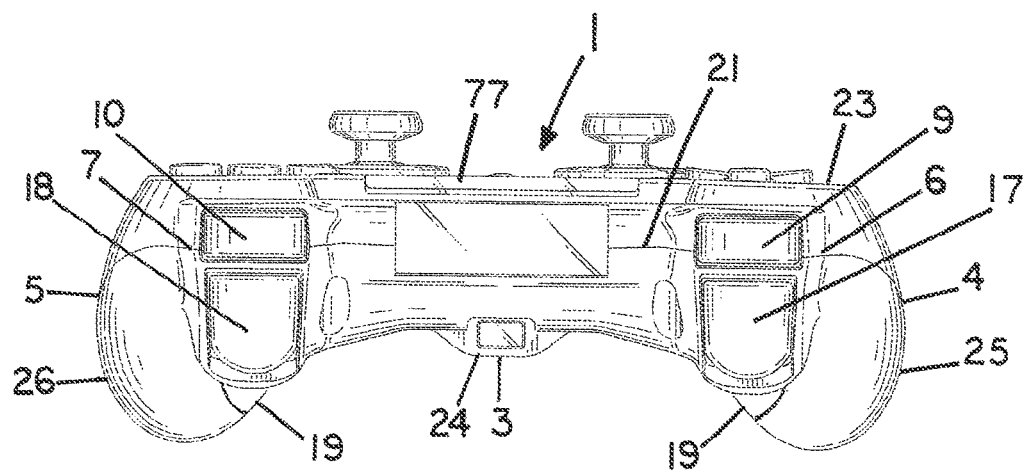
FIG. 9 is a front view of the game controller shown in FIG. 7.

FIG. 9 is a front view of the game controller shown in FIG. 7 showing a left trigger control 9 and a left bumper control 17 on the left shoulder portion 6, and a right trigger control 10 and a right bumper control 18 on the right shoulder portion 7 of the game controller 1, and a portion of the paddle controls 19, and a touch screen control 77 can also be seen.

Figure 10:
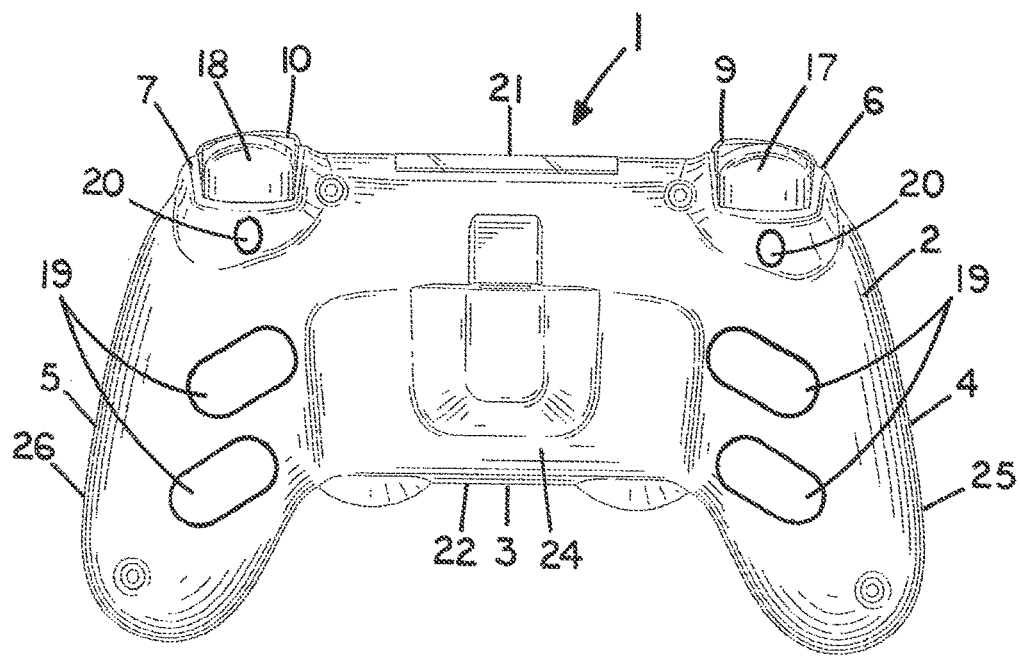
FIG. 10 is a bottom view of a game controller according to one embodiment similar to that shown in FIG. 8, but including two paddle controls on each of the left and right handle portions of the game controller.

FIG. 10 is a bottom plan view of a game controller 1 according to one embodiment that is generally similar to that shown in FIG. 8, but which includes two paddle controls 19 on the left handle portion 4 and two paddle controls 19 on the right handle portion 5 of the game controller 1.

Figure 11:
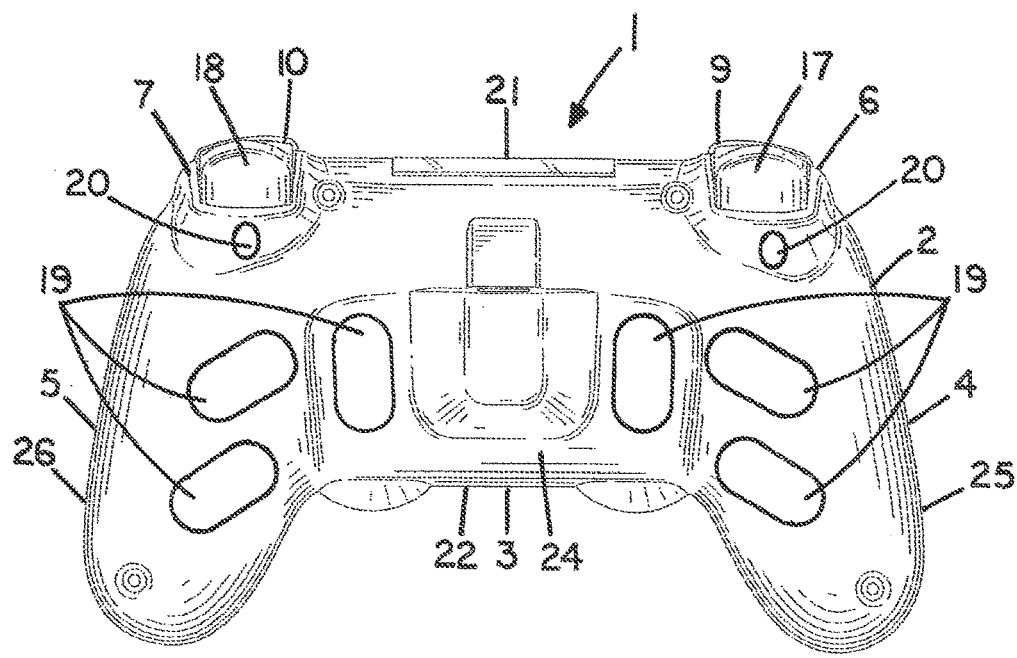
FIG. 11 is a bottom view of a game controller according to one embodiment similar to that shown in FIG. 10, but further including two paddle controls in the middle portion of the game controller.

FIG. 11 is a bottom plan view of a game controller 1 according to one embodiment that is generally similar to that shown in FIG. 8, but which further includes two paddle controls 19 in the middle portion of the game controller 1.

Figure 12:
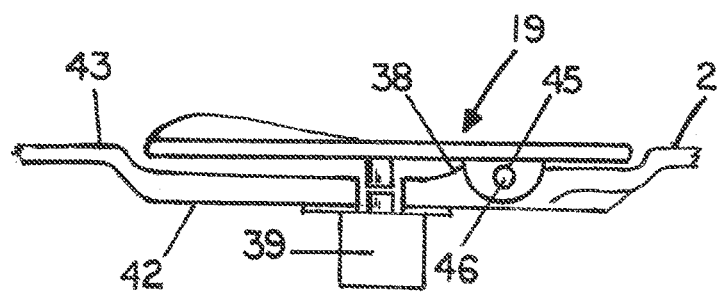
FIG. 12 is a cross-section view of a paddle control and push-button control switch according to one embodiment on the left handle portion of a game controller which is generally similar to that shown in FIG. 8, taken along line 44. The paddle control design and position of the push button control switch below is such that depressing the paddle control causes the control switch to be actuated.

FIG. 12 is a cross-section view of the left handle portion 4 of the game controller 1 shown in FIG. 8 taken along line 44, showing a portion of the interior side 42 of the case 2 and a push button control switch 39 which can be actuated by paddle control 19. The control mount 38 and switch 39 for use can be generally similar to those disclosed in the drawing FIGS. 5, 6, 15, 16, and the specification of published U.S. patent application No. 20160346682 A1 by Burgess et al., and/or as shown and discussed herein. For example, US20160346682 A1 by Burgess et al. shows in drawing FIG. 5 a portion of a game controller including four single pole push button momentary control switches that are normally associated with open circuits in the rest position and which can be made to make contact and close their corresponding circuits enabling electrical energy to flow to the game console logic board or other destination where user activation of the switch is sensed when actuated with a paddle control by a user. In this regard, when actuated a paddle control depresses the bush button on the control switch below to close the corresponding circuit. A similar structure and push bottom control switch 39 can be used in a game controller 1 according to the embodiment which is shown in FIG. 8, herein. Alternatively, the paddle control switch 39 could include a normally closed switch 39 associated with a closed circuit which goes to ground in the rest position. The control switch 39 can be single pole push button momentary control switch that is normally associated with a first closed circuit 81 which goes to ground when in the closed and resting position, but which can be made to open and therefore break the first closed circuit 81 which goes to ground and thereby cause electrical energy to instead flow in a second closed circuit 82 to the game console logic board or other destination where user activation of the switch is sensed when the control switch 39 is actuated with the paddle control 19 by a user. One possible advantage of the latter type of normally closed switch and wiring configuration is that it could possibly require less movement and deflection for effective operation and/or less wear on the contact surfaces resulting in greater durability.

Figure 13:
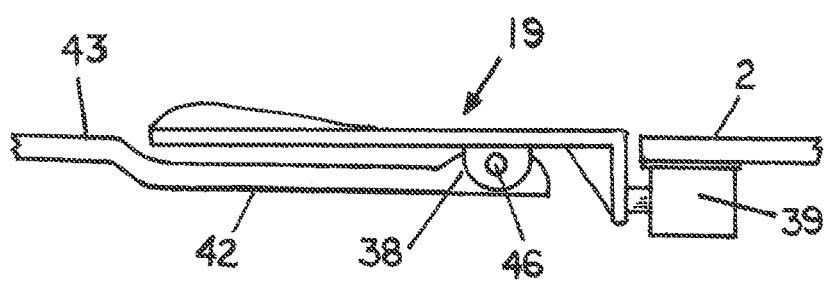
FIG. 13 is a cross-sectional view of a portion of the case of an alternative embodiment of a game controller and a push button control switch which can be activated with a paddle control by a user which is generally similar to that shown in FIG. 8, taken along line 44. The paddle control design and sideways position of the push button control switch is such that depressing the paddle control causes the control switch to be actuated.

FIG. 13 is a cross-sectional view showing a portion of the interior side 42 of the case 2 of a game controller 1 and a push button control switch 39 according to one embodiment which can be activated with a paddle control 19 by a user which is generally similar to that shown in FIG. 8, taken along line 44. The paddle control 19 design and sideways position of the push button control switch 39 is such that depressing the paddle control 19 causes the control switch 39 to be actuated. The push button control switch 39 can be a single pole push button momentary control switch 39 that is normally associated with an open circuit in the rest position and which can be made to make contact and close its corresponding circuit enabling electrical energy to flow to the game console logic board or other destination where user activation of the switch is sensed when the paddle control 19 is actuated by a user. Alternatively, the control switch 39 can be single pole push button momentary control switch that is normally associated with a first closed circuit 81 which goes to ground in the normally closed and resting position, but which can be made to break and open the first closed circuit 81 which goes to ground and thereby cause electrical energy to instead flow in a second closed circuit 82 to the game console logic board or other destination where user activation of the control switch 39 is sensed when the control switch 39 is actuated with a paddle control 19 by a user.

Figure 14:
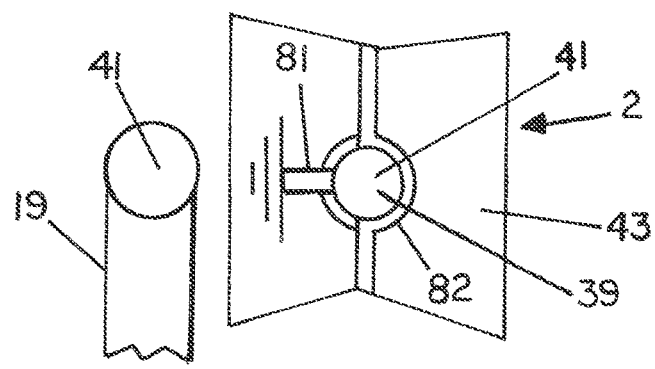
FIG. 14 is a schematic view which relates to a portion of the case of an alternative game controller and a control switch with parts broken away which can be activated with a paddle control by a user. The paddle control includes an electrically conductive contact which in the normally resting and closed position connects to a first closed ground circuit and also a second closed circuit, but when the paddle control is actuated the first closed circuit to ground is broken and electrical power can flow in the second closed circuit.

FIG. 14 is a schematic view which relates to a portion of the case 2 of an alternative embodiment of a game controller 1 and a control switch 39 according to one embodiment which can be activated with a paddle control 19 including a contact 41. The control switch 39 is normally associated with a first closed circuit 81 which goes to ground in the closed and resting position, but which can be made to break and open the first closed circuit 81 which goes to ground and thereby cause electrical energy to instead flow in a second closed circuit 82 which is no longer grounded, and then to the game console logic board or other destination where user activation of the control switch 39 is sensed when the control switch 39 is actuated with a paddle control 19 by a user. As shown in FIG. 14, the second closed circuit 82 which goes to the game console logic board or other destination where user activation of the control switch 39 is sensed is on one side or portion of a contact 41 and the first closed circuit 81 which goes to ground is located in close proximity on another side or portion of the contact 41, but is not in direct electronic communication with the second closed circuit 82. The paddle control 19 includes a corresponding contact 41 which is electrically conductive so that when the control switch 39 is in the normal closed and resting position there is electronic communication between the first closed circuit 81 and the second closed circuit 82 which effectively grounds the second closed circuit 82. However, when the paddle control 19 is actuated, the electronic communication between the first closed circuit 81 which goes to ground and the second closed circuit 82 is broken, and there is then electronic communication to the game console logic board or other destination where user activation of the control switch 39 is sensed when the control switch 39 is actuated by the paddle control 19.

Figure 15:
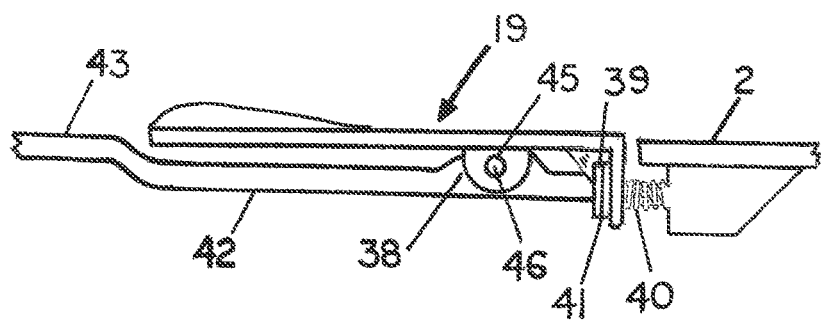
FIG. 15 is a cross-sectional view of a portion of the case of an alternative game controller and a control switch which can be activated with a paddle control by a user which is generally similar to that shown in FIG. 8, taken along line 44. The paddle control design and sideways position of the control switch spring and contact is such that depressing the paddle control causes the control switch to be actuated.

FIG. 15 is a cross-sectional view of a portion of the case 2 of a game controller 1 and a control switch 39 according to one embodiment which is generally similar to that shown in FIG. 8, taken along line 44, and which can be activated with a paddle control 19 by a user. The paddle control 19 design and sideways position of the control switch 39 spring 40 and contact 41 is such that depressing the paddle control 19 causes the control switch 39 to be actuated. As shown, the control switch 39 is normally associated with a first closed circuit 81 which goes to ground in the closed and resting position, but can be made to break and open the first closed circuit 81 which goes to ground and thereby cause electrical energy to instead flow in a second closed circuit 82 to the game console logic board or other destination where user activation of the control switch 39 is sensed when the control switch 39 is actuated with a paddle control 19 by a user.

Figure 16:
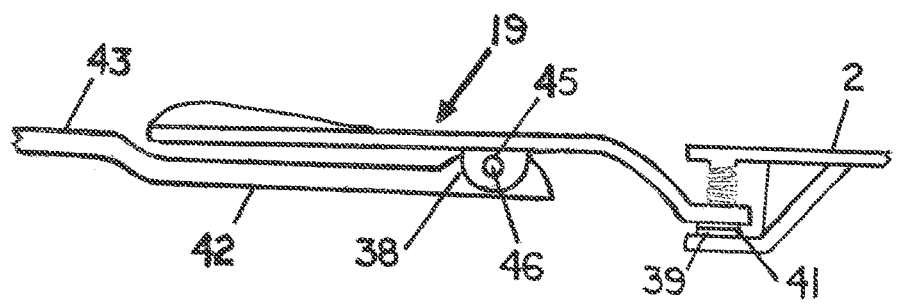
FIG. 16 is a cross-sectional view of a portion of the case of an alternative game controller and a control switch which can be activated with a paddle control by a user which is generally similar to that shown in FIG. 8, taken along line 44. The paddle control design and approximately vertical position of the control switch spring and contact is such that depressing the paddle control causes the control switch to be actuated.

FIG. 16 is a cross-sectional view of a portion of the case 2 of a game controller 1 and a control switch 39 according to one embodiment which is generally similar to that shown in FIG. 8, taken along line 44, and which can be activated with a paddle control 19 by a user. The paddle control 19 design and approximately vertical position of the control switch 39 spring 40 and contact 41 is such that depressing the paddle control 19 causes the control switch 39 to be actuated. As shown, the control switch 39 is normally associated with a first closed circuit 81 which goes to ground in the closed and resting position, but can be made to break and open the first closed circuit 81 which goes to ground and thereby cause electrical energy to instead flow in a second closed circuit 82 to the game console logic board or other destination where user activation of the control switch 39 is sensed when the control switch 39 is actuated with a paddle control 19 by a user.

Figure 17:
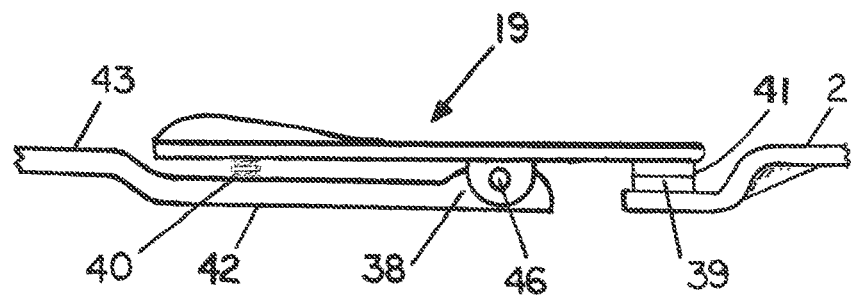
FIG. 17 is a cross-sectional view of a portion of the case of an alternative game controller and a control switch which can be activated with a paddle control by a user which is generally similar to that shown in FIG. 8, taken along line 44. The paddle control design and external position of the control switch spring and contact is such that depressing the paddle control causes the control switch to be actuated.
Figure 18:
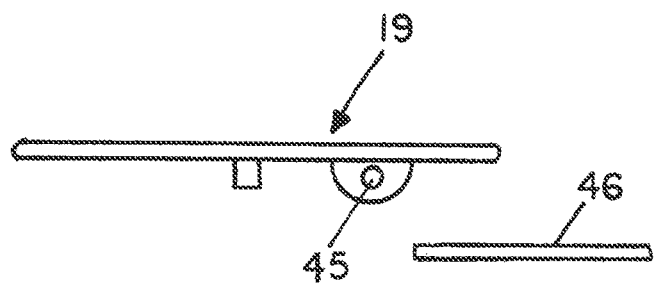
FIG. 18 is a side view of one end of an alternative paddle control showing an opening for receiving a removable retaining pin.
Figure 19:
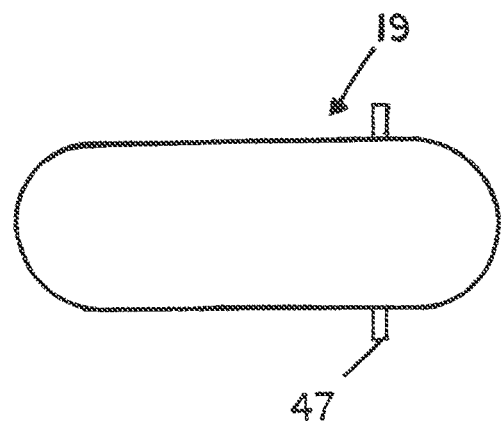
FIG. 19 is a bottom view of one end of an alternative paddle control showing an integral axle for mating with a female receptacle.
Figure 20:
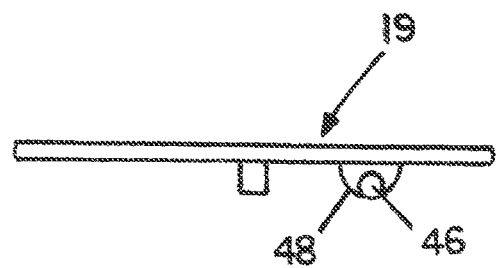
FIG. 20 is a side view of one end of an alternative paddle control showing a semi-circular female receptacle for mating with a pin fixed in the case or a removable retaining pin as shown in FIG. 18.
Figure 21:
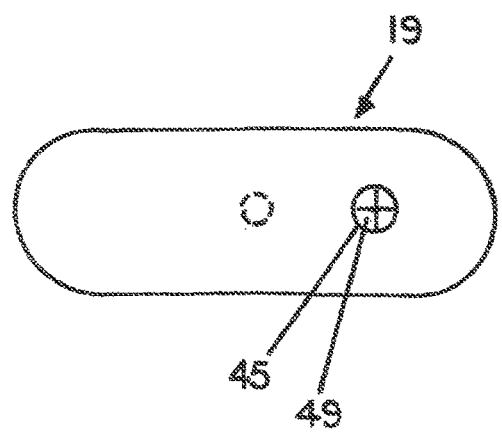
FIG. 21 is a top view of one end of an alternative paddle control including an opening for receiving a screw.
Figure 22:
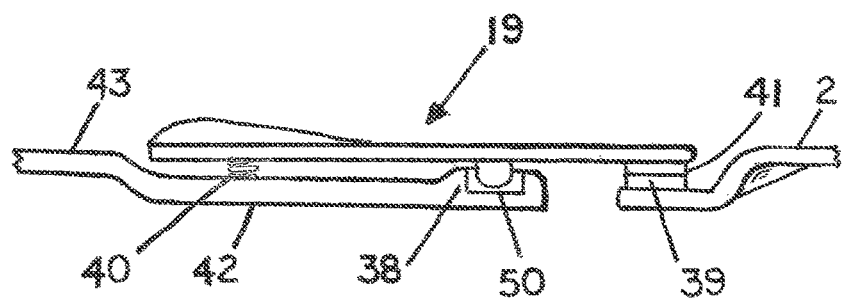
FIG. 22 is a cross sectional view of a portion of the case of an alternative embodiment of a game controller showing an alternative paddle control including a magnet 50 for mating with a second magnet secured to the case of the game controller which is generally similar to that shown in FIG. 8, taken along line 44.

FIG. 17 is a cross-sectional view of a portion of the case 2 of a game controller 1 and a control switch 39 according to one embodiment which is generally similar to that shown in FIG. 8, taken along line 44, and which can be activated with a paddle control 19 by a user. The paddle control 19 design and external position of the control switch 39 spring 40 and contact 41 is such that depressing the paddle control 19 causes the control switch 39 to be actuated. As shown, the control switch 39 is normally associated with a first closed circuit 81 which goes to ground in the closed and resting position, but can be made to break and open the first close circuit 81 which goes to ground and thereby cause electrical energy to instead flow in a second closed circuit 82 to the game console logic board or other destination where user activation of the control switch 39 is sensed when the control switch 39 is actuated with a paddle control 19 by a user. In this alternative embodiment of a game controller 1, the paddle control 19, control mount 38, retaining pin 46, spring 40, and contact 41 are all on the exterior side 43 of the case 2 which can facilitate customization and also removal and replacement of component parts. Different configurations of alternative paddle controls 19, but also different alternative springs 40 having different stiffness, and also different alternative contacts 41 can be used as desired by a user to customize a game controller 1 for game play. The contact 41 can include a conductive metal, but also a plastic, thermoplastic or rubber material which can serve as a pad. The inclusion of carbon black can render a thermoplastic or rubber material electrically conductive. Further, different paddle control 19 and switch 39 embodiments can be removably attached to game controllers 1 according to alternative embodiments using different structures and means, e.g., a paddle control 19 can alternatively include: an opening 45 for receiving a removable retaining pin 46 as shown in FIG. 18; an integral axle 47 for snap-fitting into a mating female receptacle as shown in FIG. 19; a semi-circular receptacle 48 for mating with a pin fixed in the case 2 or a removable retaining pin 46 as shown in FIG. 20; an opening 45 for receiving a screw 49 as shown in FIG. 21; and, a magnet 50 as shown in FIG. 22, and the like.

Figure 23:
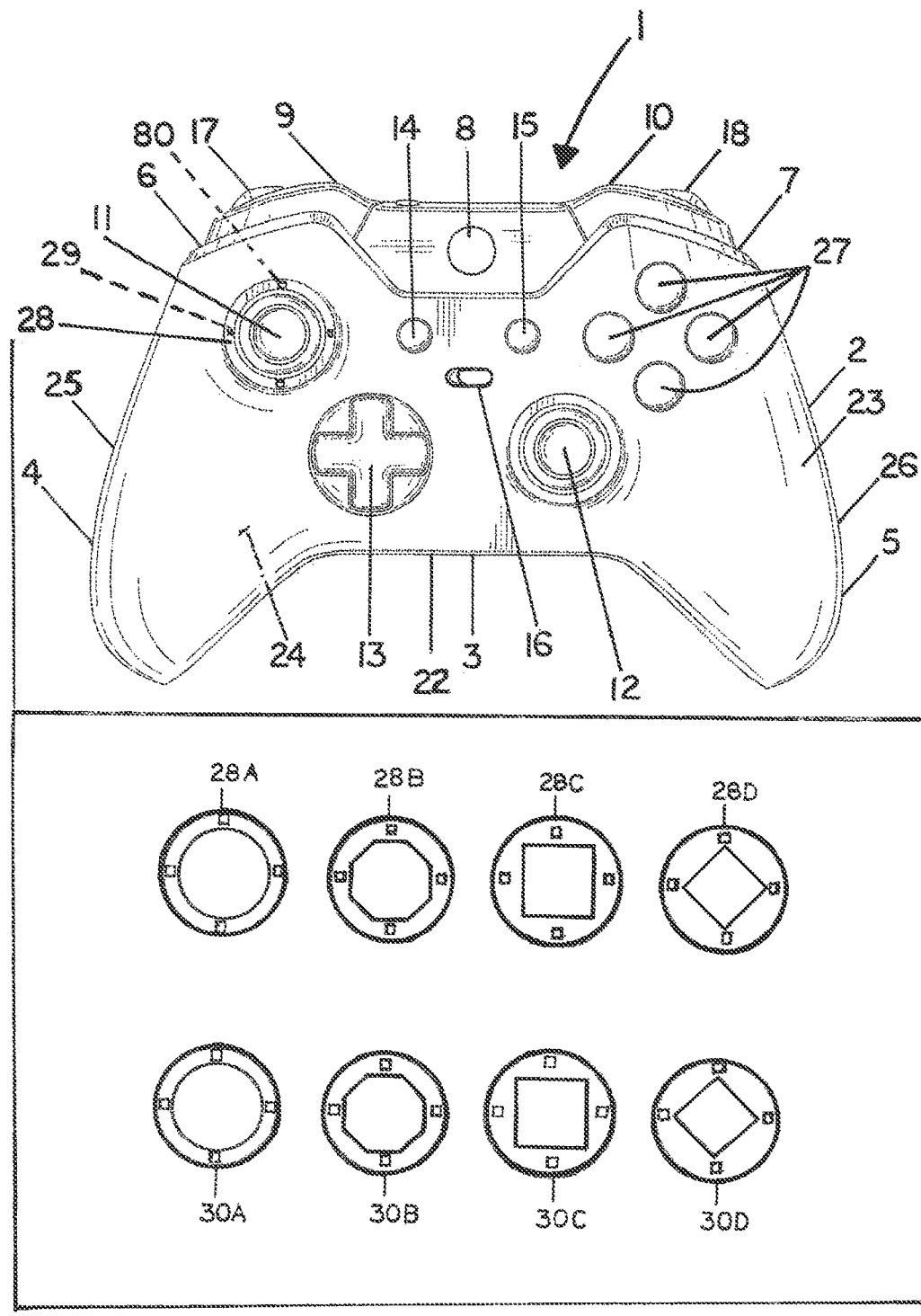
FIG. 23 is a top view of a game controller similar to that shown in FIG. 1, showing alternative retaining rings and/or gates having different geometric shapes which can be used to customize the play of thumbstick controls.

FIG. 23 is a top plan view of a game controller 1 generally similar to that shown in FIG. 1, showing a case 2 including at least one receptacle 29 for receiving different alternative removable retaining rings 28 having different geometric shapes for possible use in securing and customizing the play of a joystick control such as thumbstick control 11 and/or thumbstick control 12. The different alternative retaining rings 28 can include an integral gate 30 and/or secure a gate 30 comprising a particular geometric shape for customizing the play of at least one joystick control such as thumbstick control 11 and/or thumbstick control 12. As shown in the box portion of FIG. 23 different optional retaining rings 28 including an integral gate 30 such as a circular retaining ring 28A, octagonal retaining ring 28B, square retaining ring 28C, or a diamond retaining ring 28D can include four male snap fit appendages 79 for inserting into mating female snap fit openings 80. Alternatively, individual removable circular gate 30A, octagonal gate 30B, square gate 30C, or diamond gate 30D can include registered notches and/or openings 45 for permitted the snap fit appendages 79 on a circular retaining ring 28A to pass therethrough and then be removably secured to the receptacle 29 portion of the case 2 are also shown. A selectively removable retaining ring 28 and/or gate 30 can have a geometric shape selected from the group consisting of: a circular shape, an octagonal shape, a square shape, a diamond shape, and other geometric shapes. The retaining rings 28 and/or gates 30 can be associated with 8 way, 4 way, 2 way, and other functions and operations associated with game play.

Figure 24:
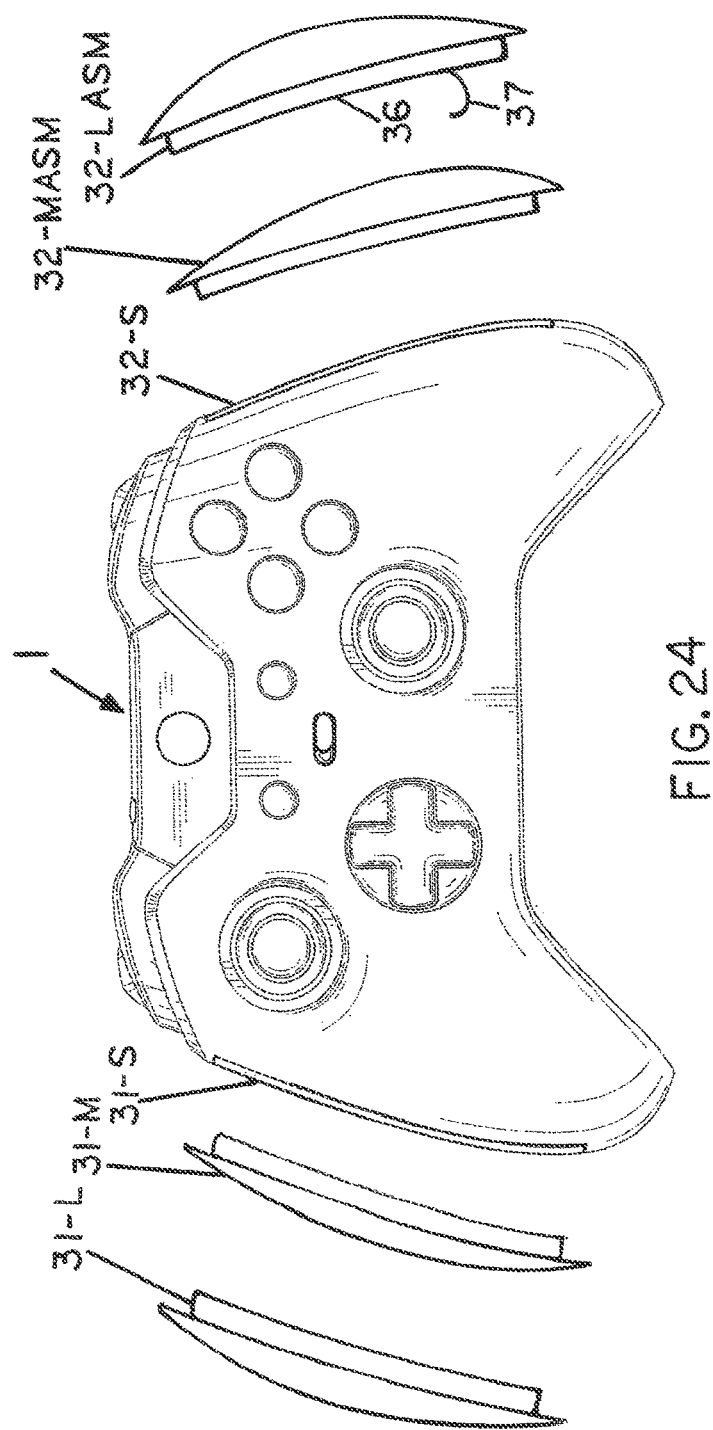
FIG. 24 is a top view of a game controller similar to that shown in FIG. 1 showing different customizable and selectively removable ergonomic grips for accommodating users having small, medium, and large hand sizes.

FIG. 24 is a top view of a game controller 1 similar to that shown in FIG. 1 showing different customizable and selectively removable ergonomic left grip 31 and right grip 32 for accommodating users having small, medium, and large hand sizes. In particular, the left grip 31 and right grip 32 can be removably attached using a friction fit, Velcro® loop and pile, adhesive means such as self-adhesive strips 36 having a peel ply layer 37, screws, rivets, snap-fit structures, other mating male and female structures, and the like. The left grip 31 can extend along a portion of the left side 25 of the case 2 in an area between the left shoulder 6 and back side 22 of the left handle 4, and the right grip 32 can extend along a portion of the right side 26 of the case 2 in an area between the right shoulder 7 and back side 22 of the right handle 5 in order to better fit the palm of a user's hand as desired. The left grip 31 and right grip 32 can then be customized and removably attached to best fit the hand size, comfort, and gaming preference of the user. In the top view shown in FIG. 24, the small size left grip 31S and right grip 32S can fit flush or nearly flush with the case 2, but the medium size left grip 31M and right grip 32M and also the large size left grip 31L and right grip 32L can project by different amounts from the normal profile of the case 2. Shown in FIG. 24 is a game controller 1 including small size left grip 31-S installed, and also showing a medium left grip 31-M, a large left grip 31-L, and a small right grip 32-S which are relatively symmetrical in shape, but also a medium right grip 32-MASYM and large right grip 32-LASYM which have an asymmetrical shape. It is possible to reverse and flip the direction of the asymmetrical grips so that the thicker portion can be either placed closer to the front 21 or the back 22 of the game controller 1. Moreover, it is possible that a user may desire and choose to use one sized grip 31 having a particular symmetrical or asymmetrical configuration on the left side 25 and a different sized grip 32 on the right side 26 of the game controller 1.

Figure 25:
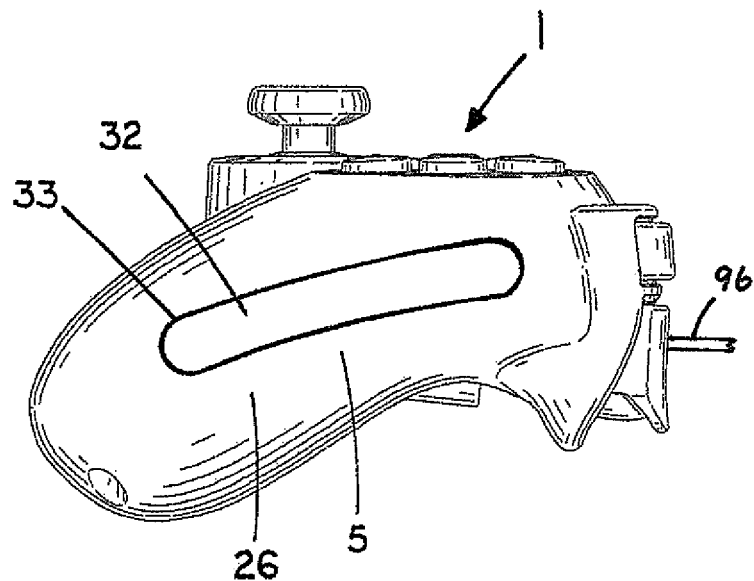
FIG. 25 is a side view of the right side of the game controller shown in FIG. 7 showing different customizable and selectively removable ergonomic grips for accommodating users having small, medium, and large hand sizes.

FIG. 25 is a right side 26 view of the game controller 1 shown in FIG. 7. As shown in FIG. 12, the right grip 32 can be customized and removably secured to the right side 26 of the right handle 5 in a location between the shoulder 7 and the back side 22 of the right handle 5. The case 2 can include a female recess 33 for inserting a male portion 34 of the right grip 32. A male portion of the right grip 32 can then be removably friction fit and/or snap fit in place on the right side 26 of the right handle 5 to secure the right grip 32. If desired, a double sided strip of self-adhesive tape 36 having a peel ply layer 37 can also be applied to the male portion 34 of the right grip 32 in order to help secure it in place, as shown on the right side of FIG. 24. Optionally, Velcro® loop and pile, screws, rivets, mechanical snap-fit, and other mating male and female structures can be used, and the like. In FIG. 25, the possible use of a wire or fiber optical cable 96 is also shown with part of the cable 96 being broken away. Alternatively, a game controller 1 can be connected to a computer or game console using wireless communication.

Figure 26:
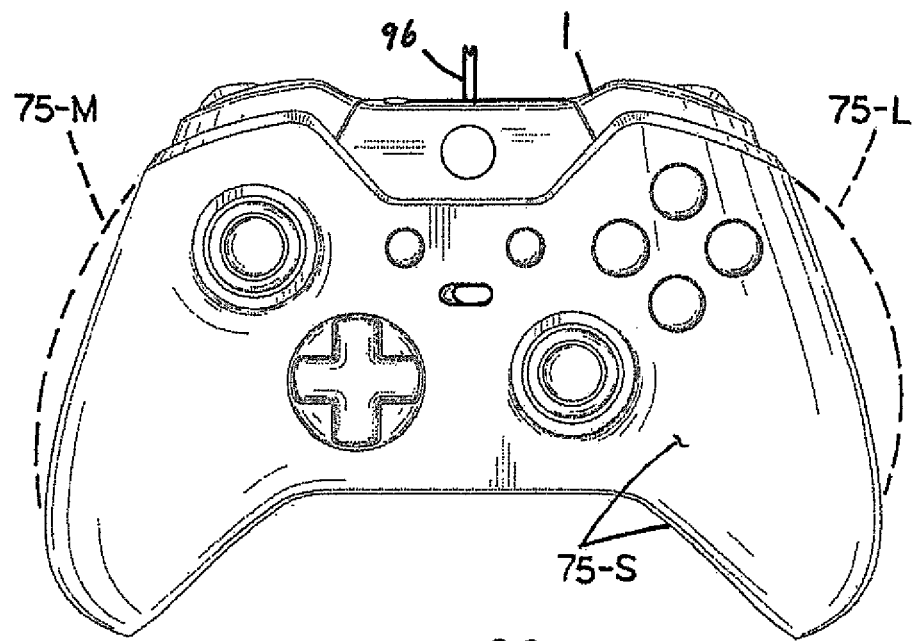
FIG. 26 is a top view of a resilient cover for use with a game controller similar to that shown in FIG. 1 which can be provided in small, medium, and large hand sizes.

FIG. 26 is a top view of a resilient stretch to fit game control cover 75 which can be made using a silicone or thermoplastic rubber material, and in ergonomic configurations to fit users having small 75S, medium 75M, and large 75L hand sizes. The possible use of a wire or fiber optical cable 96 is also shown in FIG. 26 with part of the cable 96 being broken away. Alternatively, a game controller 1 can be connected to a computer or game console using wireless communication.

Figure 27:
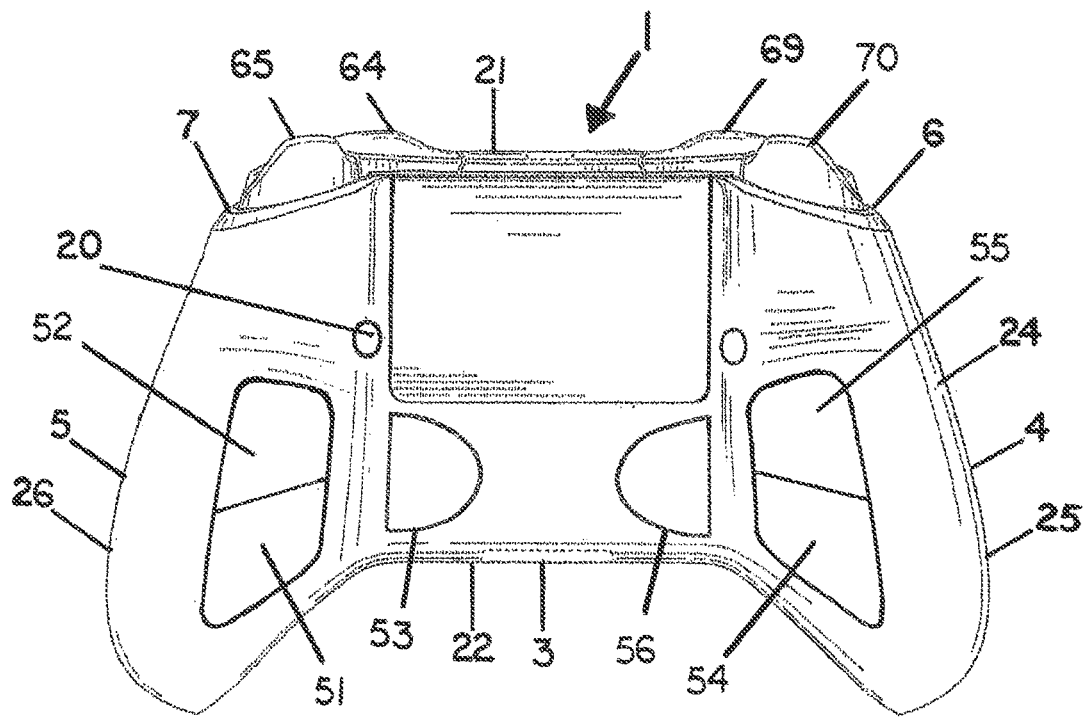
FIG. 27 is bottom view of a game controller according to one embodiment which can include controls and features resembling those shown on the top side and front side of the alternate embodiments shown in FIG. 1, but which include two keys for actuating switches generally similar to those used on mouse devices on each handle, and also two keys in the middle portion of the game controller.

FIG. 27 is bottom view of a game controller 1 according to one embodiment which can include controls and features resembling those shown on the top side 23 of the embodiment shown in FIG. 1, but instead includes on the bottom side 24 two push keys 51 and 52 on the right handle portion 5, a push key 53 on the right part of the middle portion 3, two push keys 54 and 55 on the left handle portion 4, and another push key 56 on the left part of the middle portion 3 for actuating control switches 39, and on the front side 21 near the right shoulder portion 7 includes a push right trigger key 64 and right bumper key 65, and on the front side 21 near the left shoulder portion 6 includes a push left trigger key 69 and left bumper key 70. The control switches 39 can be push-button and similar to those which are commonly used on mouse devices. Computer mouse devices sometimes use OMRON® brand switches type DZFC-7N in 10 or 20 mm. The structure and function of the selection keys and switches used in keyboards and various mouse devices which can be suitable for use are disclosed in the following U.S. patents:

U.S. Pat. No. 4,508,942 by Inaba, U.S. Pat. No. 6,313,826 B1 by Schrum et al., U.S. Pat. No. 6,135,886 by Armstrong, U.S. Pat. No. 6,256,013 B1 by Siddiqui, U.S. Pat. No. 6,933,925 B1 by Gibbons, U.S. Pat. No. 7,205,980 B2 by Maroun, U.S. Pat. No. 7,345,674 B2 by McLoone et al., U.S. Pat. No. 7,656,389 B2 by Adan et al., U.S. Pat. No. 7,939,774 B2 by Corcoran et al., U.S. Pat. No. 7,948,474 B2 by Chatterjee et al., U.S. Pat. No. 7,995,035 B2 by Wu, U.S. Pat. No. 8,547,334 B2 by Min-Liang et al., and U.S. Pat. No. 9,372,588 B2 by Dietz et al., all of these patents are hereby incorporated by reference herein. Several of these patents disclose pressure sensitive switches which can vary the electrical signal communicated during actuation depending upon the pressure being applied such as U.S. Pat. No. 6,135,886 by Armstrong, and U.S. Pat. No. 9,372,588 B2 by Dietz et al., and such can be suitable for use as desired.

For example, a game controller can include and use force sensing potentiometers also known as pressure sensitive touch switches and/or touch pads which sense force and/or position and use variable resistance induced by the finger pressure of an individual to control movement and/or other action in a video game. Several of the thin or thick film FSR, that is, Force Sensing Resistor products made by the OHMITE Manufacturing Company of Warrenville, Illinois can be used, and in particular, the products identified as FSR04, FSR05, FSR06, and FSR07 which can be viewed on their website www.ohmite.com and purchased online from www.mouser.com. The OHMITE company's FSR04 and FSR05 products can be used for the left selection control 14, right selection control 15, the action controls 27, and other controls which can be disposed on the top side 23 of a game controller 1 on raised protrusions 85, as shown in drawing FIG. 39, or be otherwise located on the top side 23, bottom side 24, and other sides or surfaces on the exterior side 43 of a game controller 1. These force sensing switches can be used instead and/or as an alternative to the four or more mechanical push button controls, and in particular, the cluster of four push button controls which are often labeled A, B, X, and Y and found on the top side of conventional game controllers such as the aforementioned game controllers made by Sony® and the Xbox® game controllers made by the Microsoft Corporation. Further, the OHMITE FSR04, FAR05 products, and in particular, the FSR06 and FSR07 products can be disposed on the left shoulder portion 6 and right shoulder portion 7 near and/or on the front side 21 of a game controller 1 as shown in drawing FIG. 34, and these force sensing switches can then be used instead and/or as an alternative to the conventional mechanical switches for the left trigger key, left bumper key, right trigger key, and right bumper key(s) which are found on the aforementioned conventional game controllers. Most of the OHMITE products have a life expectancy of ten million cycles and they can provide a long service life. According to OMHITE, the actuation force using one hundred samples to reach 10 MQ when using the OHMITE FSR04 product is less than 20 grams, and the actuation force of the FAR05 product is less than 30 grams, and the actuation force of the FSR06 and FSR07 products is less than 15 grams. Some individuals who use computers, pads, and game controllers like to rest their fingers on some of the controls, and the sensitivity of those controls can affect performance. In this regard, a sensitivity of less than 10 grams can be too sensitive and often result in the unintentional actuation of a touch control. On the other hand, an individual's speed and performance when using a touch control can be impaired if and when the required amount of force to actuate the control is too great. Accordingly, it can be advantageous that the actuation force for a touch control not exceed 50 grams. A typical range of actuation force for a resistive force sensitive touch control for use on a game controller is in the range of between about 10-50 grams, and within this range the more typical range is in the range of between about 15-30 grams. The measured force value in grams regarding the pressure sensors made by OHMITE, and others, is taken from a force curve which is generated using a test protocol using a domed 9 mm diameter 45 Shore A silicone tip specified in ASTM F1578-07 (2014) entitled Standard Test Method For Contact Closure Cycling Of A Membrane Switch, hereinafter simply identified and recited as ASTM 1578, to apply force to the center of the pressure sensor being tested, and the tip moves down slowly, gradually increasing the force which is then measured with a loadcell and the resistance is recorded using a digital to analog converter. For example, Norman Tools Test Equipment & Supplies of Evansville, Indiana makes a PFTE-1 Pneumatic Finger Tester which can be operated using test method reference ASTM 1578. This device can be calibrated using a scale to provide accurate readings in grams when used to apply a force to the domed 9 mm diameter 45 Shore A silicone tip used during testing. ASTM F2592-16 entitled Standard Test Method For Measuring The Force-Displacement Of A Membrane Switch, hereinafter simply identified and recited as ASTM 2592, is another test method which could possibly be used to test a typical range of force between about 10-50 grams, and within this range the more typical range is in the range of between about 15-30 grams.

Figure 38:
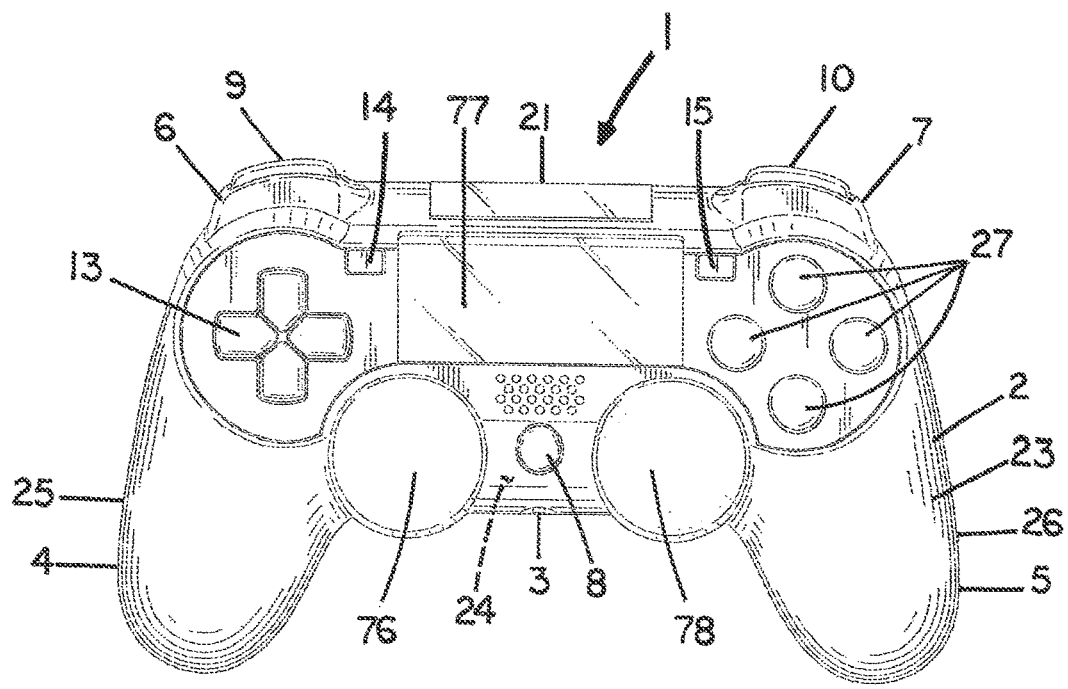
FIG. 38 is a top view of a game controller according to one embodiment including at least two touch pads and a touch screen on the top side of the game controller.

In addition, OHMITE makes a round or donut shaped force sensing resistor product identified as FSP03CE which can sense both pressure and position, and this product can be used instead and/or as an alternative to at least one of the conventional left joystick 11 and/or left directional pad controls 13, which are commonly disposed on the top side 23 of conventional game controllers, as shown in drawing FIG. 38.

Figure 28:
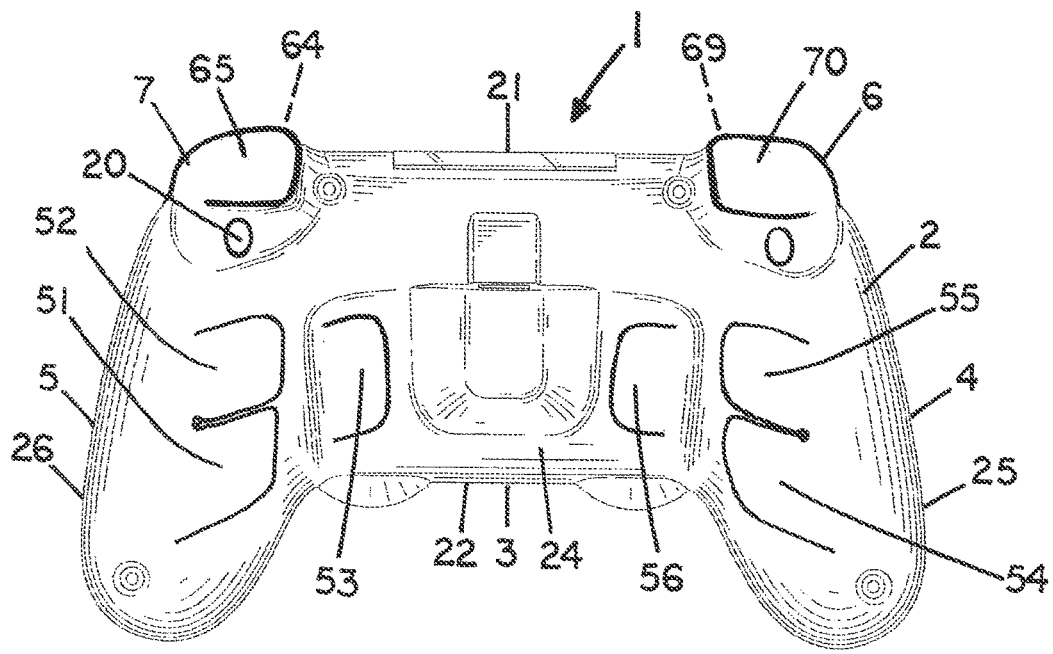
FIG. 28 is bottom view of a game controller according to one embodiment which can include controls and features resembling those shown on the top side and front side of the alternate embodiments shown in FIG. 7, but which includes two keys for actuating switches generally similar to those used on mouse devices on each handle portion, and also two keys in the middle portion of the game controller.

FIG. 28 is bottom view of a game controller 1 according to one embodiment which can include controls and features resembling those shown on the top side 23 of the embodiment shown in FIG. 7, but instead includes on the bottom side 24 two push keys 51 and 52 on the right handle portion 5, a push key 53 on the right part of the middle portion 3, two push keys 54 and 55 on the left handle portion 4, and another push key 56 on the left part of the middle portion 3 for actuating control switches 39, and on the front side 21 near the right shoulder portion 7 includes a push right trigger key 64 and right bumper key 65, and on the front side 21 near the left shoulder portion 6 includes a push left trigger key 69 and left bumper key 70. The control switches 39 can be push-button and similar to those which are commonly used on mouse devices, as discussed above in connection with FIG. 27.

Figure 29:
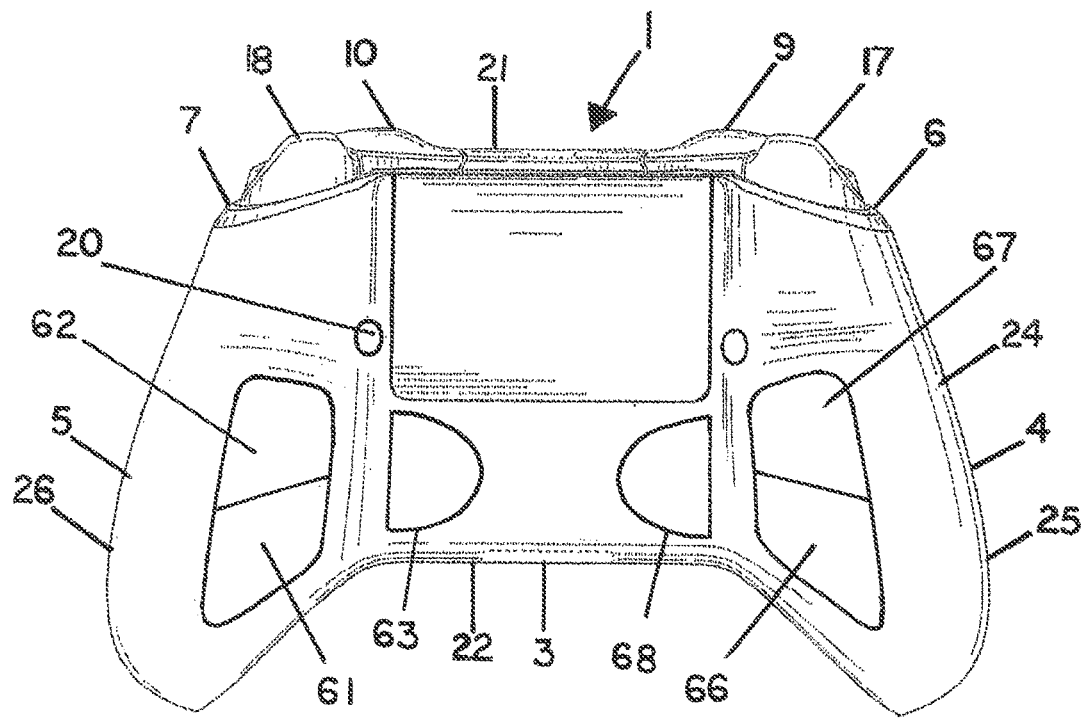
FIG. 29 is bottom view of an alternative embodiment of a game controller which can include controls and features resembling the those shown on the top side and front side of the alternate embodiments shown in FIG. 1, but which includes a plurality of touch pads on each of the left handle portion and right handle portion and also in the middle portion for actuating control of game play.

FIG. 29 is bottom view of a game controller 1 according to one embodiment which can include controls and features resembling those shown on the top side 23 and front side 21 of the embodiment shown in FIG. 1, but instead includes on the bottom side 24 two touch pads 61 and 62 on the right handle portion 5, a touch pad 63 on the right part of the middle portion 3, two touch pads 66 and 67 on the left handle portion 4, and a touch pad 68 of the left part of the middle portion 3 for actuating control of game play. The structure and function of touch pads is disclosed in numerous patents by the Microsoft Corporation including: U.S. Pat. No. 7,659,887 B2 by Larsen et al., U.S. Pat. No. 7,813,774 B2 by Perez-Noguera, U.S. Pat. No. 7,880,727 B2 by Abanami et al., U.S. Pat. No. 8,581,852 B2 by Izadi et al., U.S. Pat. No. 8,648,822 B2 by Weiss, U.S. Pat. No. 8,665,244 B2 by Large et al., U.S. Pat. No. 8,754,855 B2 by Duncan et al., U.S. Pat. No. 8,884,907 B2 by Townsend et al., U.S. Pat. No. 8,913,019 B2 by Zhao et al., U.S. Pat. No. 8,933,912 B2 by Ambrus et al., U.S. Pat. No. 8,982,051 B2 by Rosenfeld et al., U.S. Pat. No. 9,098,117 B2 by Lutz et al., U.S. Pat. No. 9,152,288 B2 by Dietz, U.S. Pat. No. 9,174,124 B2 by Hammontree et al., U.S. Pat. No. 9,223,471 B2 by Buxton et al., U.S. Pat. No. 9,250,753 B2 by Westhues et al., U.S. Pat. No. 9,285,907 B2 by Weiss et al., U.S. Pat. No. 9,335,900 B2 by Weiss et al., U.S. Pat. No. 9,354,804 B2 by Berkes et al., U.S. Pat. No. 9,377,646 B2 by Westues et al., U.S. Pat. No. 9,436,338 B2 by Keller et al., U.S. Pat. No. 9,501,218 B2 by Hwang et al, and U.S. Pat. No. 9,519,419 B2 by Hinckley et al., and all of these patents are hereby incorporated by reference herein. Within this group of patents: U.S. Pat. No. 8,913,019 B2 by Zhao et al. discloses multi-finger detection and control, U.S. Pat. No. 8,982,051 B2 by Rosenfeld et al. discloses a touch pad including multi-finger detection and control on a curved geometric feature; U.S. Pat. No. 9,377,646 B2 by Westues et al. disclosures a touch control including an oblique electrode matrix; U.S. Pat. No. 9,174,124 B2 by Hammontree et al. disclosures touch directional controls having similar function to analog joysticks; and, U.S. Pat. No. 8,581,852 B2 by Izadi et al. and U.S. Pat. No. 8,665,244 B2 by Large et al. disclose structures and methods of optical touch detection and actuation. Other patent applications which disclose finger actuated and/or touch sensitive controls include U.S. 20200353349 A1 by Palmer et al. and US20190291000 A1 by Campbell et al. which are assigned to the Valve Corporation of Bellevue, Washington, and both of these patent applications are hereby incorporated by reference herein. Touch pads that work upon physical contact by a user via impedance or optical sensor(s) can be faster than mechanical switches, and also possibly more durable. For example, touch switches or touch pads, trackpads, and/or modules which are capacitive instead of pressure sensitive, and which can sense touch and/or position and/or movement can be used in a game controller. In this regard, electrical resistance is the opposition to the flow of electric current in the circuit. Impedance is opposition to the flow of current because of any three components that is resistive, inductive, or capacitive, and is a combination of both resistance and reactance in a circuit. The direct contact and/or proximity of a user's finger or thumb can change the capacitance and/or impedance of a capacitive control and/or its associated circuit so as to actuate the control and initiate a command. In this regard, the typical range of the distance required to actuate a capacitive control is the range between and including direct contact of a finger of a user and a distance of the same finger equal to or less than ¼ inch or 6.35 mm from the capacitive control. When an even faster response time is desired for initiating a command, function, or operation, the typical range of the distance required to actuate a capacitive control is the range between and including direct contact of a finger of a user and a distance of the same finger equal to or less than ⅛ths inch or 3.175 mm from the capacitive control.

One manufacturer and/or distributer of capacitive switches is Adafruit Industries of New York, New York which has a website www.adafuit.com. The Adafruit 1374 standalone capacitive one channel touch sensor identified as part number AT42QT1012 can be used instead of conventional mechanical switches for the bumpers and/or triggers of a game controller. This capacitive switch is quite sensitive and can be triggered when an individual's finger gets in close proximity to the contact surface of the switch, and the switch will then remain in the on position for as long as the individual's finger remains in contact with the surface of the switch. The Adafruit 1374 touch sensor can also be remotely triggered if a conductive material which is in contact the top surface of the sensor and extends therefrom is touched by the finger of an individual. Another manufacturer of a capacitive switch module that includes four touch pads is the OSEPP product 4DTOUCH-01 of Leo Sales, Ltd. of Richmond, British Columbia, Canada, and which can be viewed on the website www.OSEPP.com. Another example of a capacitive switch module that include eight touch pads is the Anself brand TTP226 8-Way Channel Capacitive Touch Switch Digital Touch Sensor Module PCB Board which has a working voltage between 2.4-5.5 volts and is sold on the website www.Walmart.com. A wire or other conductive material can be connected or otherwise be placed in electrical communication with one or more of the four touch pads and extend to a conductive surface, metallic element, and/or touch pad on the exterior side 43 a game controller where an individual can make direct contact or alternatively proximate or near contact with their finger in order actuate or trigger the capacitive switch. A conductive wire, a thin piece of aluminum foil or other conductive metal, a conductive paint, a conductive plastic, and/or a conductive wire which is connected to a conductive element 88 which can possibly be made of metal and is disposed on the exterior side 43 of a game controller 1 can be used to make an electrical connection to the aforementioned OSEPP capacitive switch module, as shown in drawing FIG. 33 and also drawing FIG. 40. Accordingly, the switch functions which have been associated with having two conventional mechanical bumper switches and two conventional mechanical trigger switches disposed near and/or on the front side of a conventional game controller as found in the aforementioned game controllers made by Sony® and the Xbox® game controllers made by the Microsoft Corporation can be effectively replaced in by using the four capacitive switches of a single OSEPP capacitive switch module. This can result in cost savings relative to the possible alternative use of four individual Adafruit 1374 capacitive switches or four conventional mechanical switches. Further, capacitive touch switches and/or touch pads can also possibly be used for the left selection control 14, right selection control 15, the action controls 27, and other controls which can be disposed on the top side 23 of a game controller 1 on raised protrusions 85, as shown in drawing FIG. 40, but also for other switches and controls located on the top side 23, bottom side 24, and other sides or surfaces on the exterior side 43 of a game controller 1. These force sensing switches can be used instead and/or as an alternative to the four or more mechanical push button controls, and in particular, the cluster of four push button controls which are often labeled A, B, X, and Y and found on the top side of conventional game controllers such as the aforementioned game controllers made by Sony® and the Xbox® game controllers made by the Microsoft Corporation. It is possible for capacitive switches to be triggered faster and with less effort relative to conventional mechanical switches and depending upon the video game and player this advantage can possibly be used to enhance the speed and quality of game play, and reduce fatigue of the fingers and hands of an individual player. Further, a game controller 1 can include a sensitivity control within its selection control and/or menu controls in order to customize and regulate the sensitivity of one or more touch pad controls.

However, depending upon the video game, player, and other circumstances, it can sometimes be advantageous to use force sensing potentiometers also known as pressure sensitive touch switches and/or touch pads for the functions which have been associated with the bumpers and triggers located near or on the front side of conventional game controllers. It is also possible that force sensing potentiometers and capacitive switches could be advantageous for use regarding the functions which have been associated with either the mechanical bumper switches or the mechanical trigger switches often used on conventional game controllers, but not for both of these functions. For example, it is possible that force sensing potentiometers could be more advantageous for use regarding the functions which have been previously associated with the mechanical bumper switches, but not the mechanical trigger switches, or vice-versa, that is, depending on the individual player, video game, and/or other circumstances such as the quality of the computer or game platform being used and/or that of the available internet connection. Accordingly, it could be advantageous to use capacitive switches or controls in combination with resistive pressure sensitive switches or controls on a game controller. For this reason, a modular game controller 1 is shown in drawing FIG. 43 which includes four selectively removable touch switches or touch pads disposed near and/or on the front side 21 which can be removably coupled and secured to the case 2 and also the required electrical connections so that the controls used in these locations which could possibly be used to perform functions associated with the mechanical bumper and trigger switches of conventional game controllers can be selected for use and the game controller 1 then be customized as desired by an individual user or game player.

Moreover, as an alternative to and/or instead of the right joystick which is commonly located on the top side of many conventional game controllers such as the aforementioned game controllers made by Sony® and the Microsoft Corporation, the round, elliptical, or rectangular shaped capacitive modules identified as ProxSense® GPIO Gesture Trackpads made by the Azoteq company of Austin, Texas, can be used on a game controller, as shown in drawing FIG. 38. One example of a capacitive round touch pad made by Azoteq is identified as product TPR 48, and this touch pad and others can be viewed on the company's website www.azoteq.com. A rectangular touch pad and module development tool made by Azoteq that is identified as product IQS550 EV02-S and which includes capacitance touch sensor TPS65-201A-S can be used in conjunction with the programmers processor-based product CT210A-S which can be purchased on the website www.mouser.com, and these components and can then be used with the IQS5XX B000 PC Software that can be downloaded from the Azoteq website www.azoteq.com.

Figure 30:
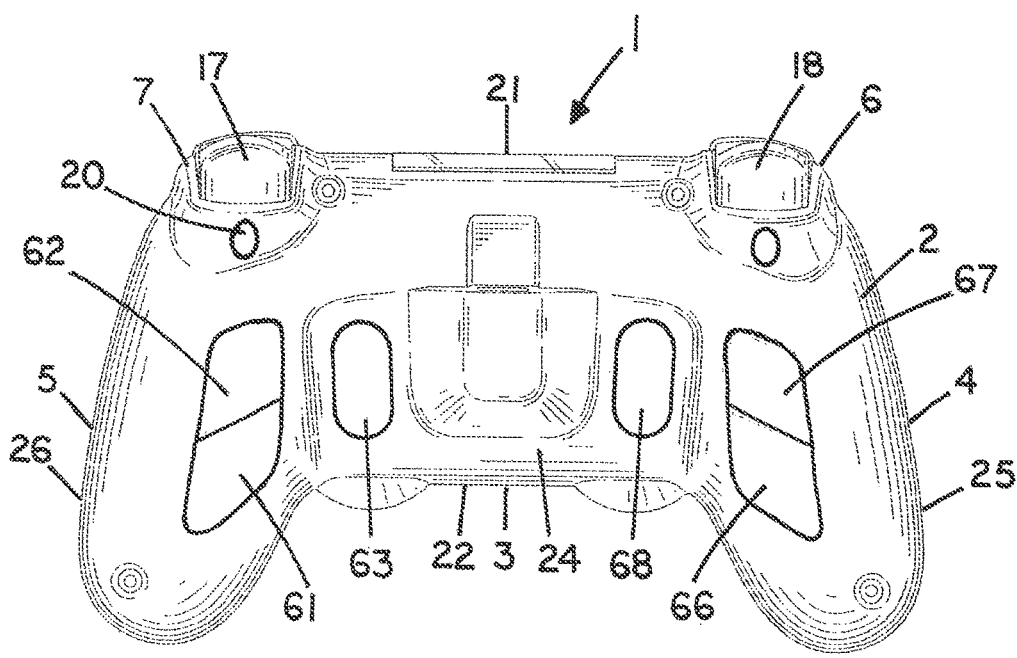
FIG. 30 is bottom view of an alternative embodiment of a game controller which can include controls and features resembling the those shown on the top side and front side of the alternate embodiments shown in FIG. 7, but which includes a plurality of touch pads on each of the left handle portion and right handle portion and also in the middle portion for actuating control of game play.

FIG. 30 is bottom view of a game controller 1 according to one embodiment which can include controls and features resembling those shown on the top side 23 and front side 21 of the embodiment shown in FIG. 7, but instead includes on the bottom side 24 a plurality of touch pads 61, 61, 63 on the right handle portion 5 and a plurality of touch pads 66, 67, and 68 on the left handle portion 4 for actuating control of game play. At least two or three separate touch pads can be included on each of the left handle portion 4 and the right handle portion 5, as discussed above in connection with FIG. 29.

Figure 31:
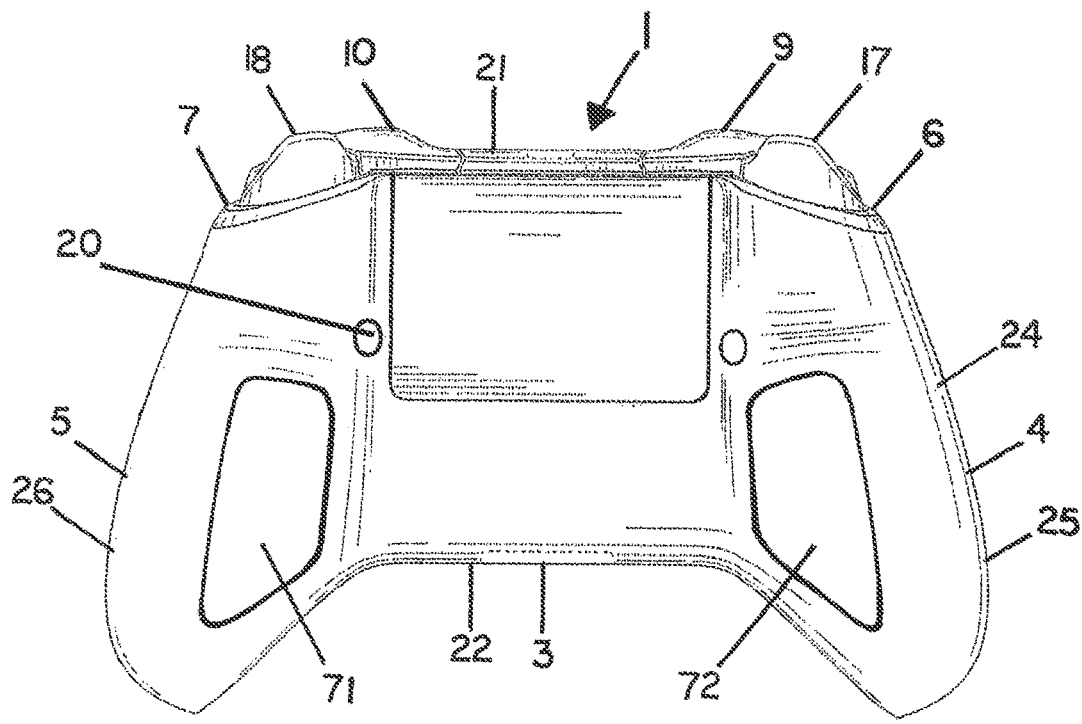
FIG. 31 is a bottom view of a game controller according to one embodiment which shows a single touch pad on the left handle portion, and a single touch pad on the right handle portion.

FIG. 31 is a bottom view of a game controller according to one embodiment which can include controls and features resembling those shown on the top side 23 and front side 21 of the embodiment shown in FIG. 1, but which instead includes a single touch pad 71 on the right handle portion 5, and a single touch pad 72 on the left handle portion 4 which each have multi-finger detection and control capability and can be mapped and selected for desired control functions and operations. Once again, U.S. Pat. No. 8,913,019 B2 by Zhao et al. discloses multi-finger detection and control, U.S. Pat. No. 8,982,051 B2 by Rosenfeld et al. discloses a touch pad including multi-finger detection and control on a curved geometric feature; U.S. Pat. No. 9,377,646 B2 by Westues et al. disclosures a touch control including an oblique electrode matrix; U.S. Pat. No. 9,174,124 B2 by Hammontree et al. disclosures touch directional controls having similar function to analog joysticks; and, U.S. Pat. No. 8,581,852 B2 by Izadi et al. and U.S. Pat. No. 8,665,244 B2 by Large et al. disclose structures and methods of optical touch detection and actuation.

Figure 32:
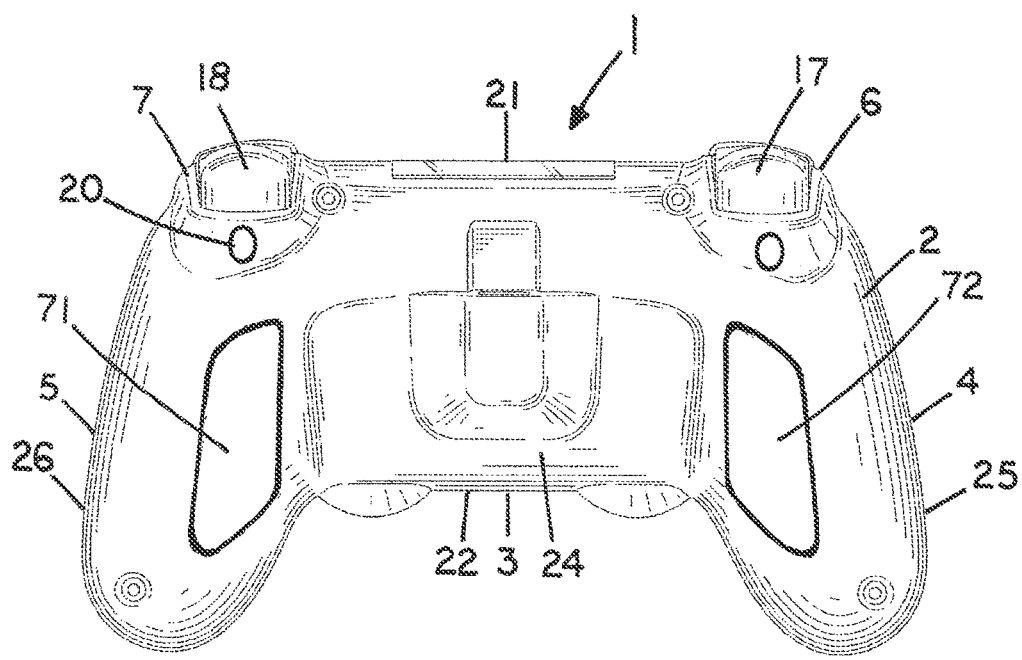
FIG. 32 is a bottom view of a game controller according to one embodiment which shows a single touch pad on the left handle portion, and a single touch pad on the right handle portion.

FIG. 32 is a bottom view of a game controller according to one embodiment which can include controls and features resembling those shown on the top side 23 and front side 21 of the embodiment shown in FIG. 7, but which instead includes a single touch pad 71 on the right handle portion 5, and a single touch pad 72 on the left handle portion 4 which each have multi-finger detection and control capability and can be mapped and selected for desired control functions and operations, as discussed above in connection with FIG. 31.

Figure 33:
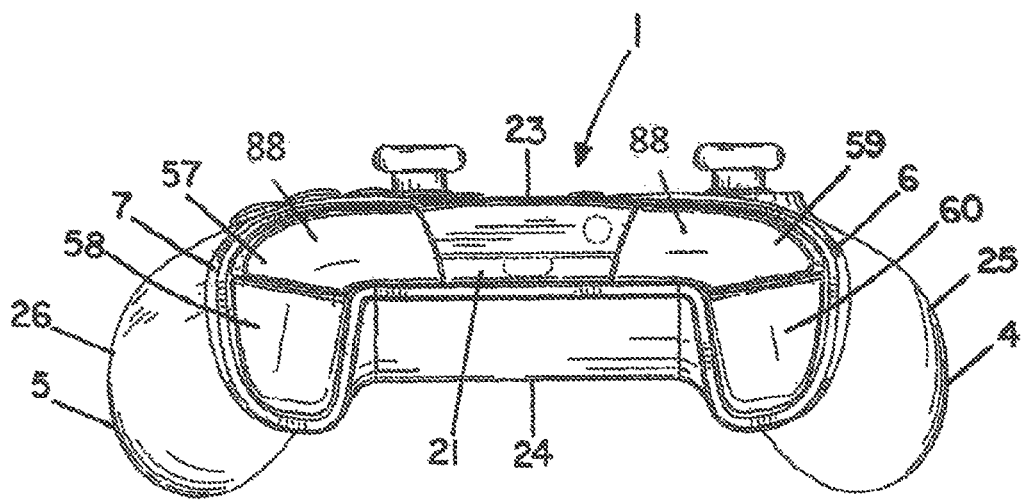
FIG. 33 is a front view of a game controller according to one embodiment including two touch pads on the right shoulder portion, and two touch pads on the left shoulder portion.

FIG. 33 is front view of a game controller 1 according to one embodiment which can include controls and features resembling those shown on the top side 23 of the embodiment shown in FIG. 1, but which instead includes a touch pad 57 and also a touch pad 58 on the right shoulder portion 7, and a touch pad 59 and also a touch pad 60 on the left shoulder portion 6 for actuating control of game play. For example, touch pads 57, 58, 59, and 60 could be force sensing potentiometers also known as pressure sensitive touch switches and/or touch pads which sense force and/or position and use variable resistance induced by the finger pressure of an individual to control movement and/or other action in a video game, as previously discussed herein. Alternatively, touch pads 57, 58, 59, and 60 could be touch switches and/or touch pads which are capacitive instead of pressure sensitive, and which can sense touch and/or position and/or movement as previously discussed herein. Alternatively, touch pads 57, 58, 59, and 60 could include conductive elements 88 which are connected or otherwise in electrical communication with touch switches which are capacitive instead of pressure sensitive, and which can sense touch and/or position and/or movement as previously discussed herein. Alternatively, touch pads 57 and 59 could be touch switches and/or touch pads which are pressure sensing and use variable resistance, and touch pads 58 and 60 could be touch switches and/or touch pads which are capacitive instead of pressure sensitive, and vice-versa, that is, touch pads 57 and 59 could be capacitive and touch pads 58 and 60 could be pressure sensitive.

Figure 34:
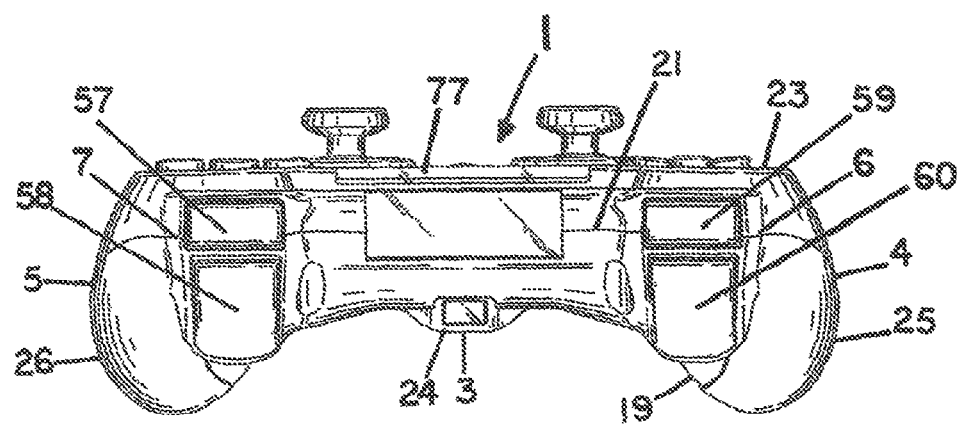
FIG. 34 is a front view of a game controller according to one embodiment including two touch pads on the right shoulder portion, and two touch pads on the left shoulder portion.

FIG. 34 is front view of a game controller 1 according to one embodiment which can include controls and features resembling those shown on the top side 23 of the embodiment shown in FIG. 7, but which instead includes a touch pad 57 and also a touch pad 58 on the right shoulder portion 7, and a touch pad 59 and also a touch pad 60 on the left shoulder portion 6 for actuating control of game play. For example, touch pads 57, 58, 59, and 60 could be force sensing potentiometers also known as pressure sensitive touch switches and/or touch pads which sense force and/or position and use variable resistance induced by the finger pressure of an individual to control movement and/or other action in a video game, as previously discussed herein. Alternatively, touch pads 57, 58, 59, and 60 could be touch switches and/or touch pads which are capacitive instead of pressure sensitive, and which can sense touch and/or position and/or movement as previously discussed herein. Alternatively, touch pads 57, 58, 59, and 60 could include conductive elements 88 which are connected or otherwise in electrical communication with touch switches which are capacitive instead of pressure sensitive, and which can sense touch and/or position and/or movement as previously discussed herein. Alternatively, touch pads 57 and 59 could be touch switches and/or touch pads which are pressure sensing and use variable resistance, and touch pads 58 and 60 could be touch switches and/or touch pads which are capacitive instead of pressure sensitive, and vice-versa, that is, touch pads 57 and 59 could be capacitive and touch pads 58 and 60 could be pressure sensitive.

Figure 35:
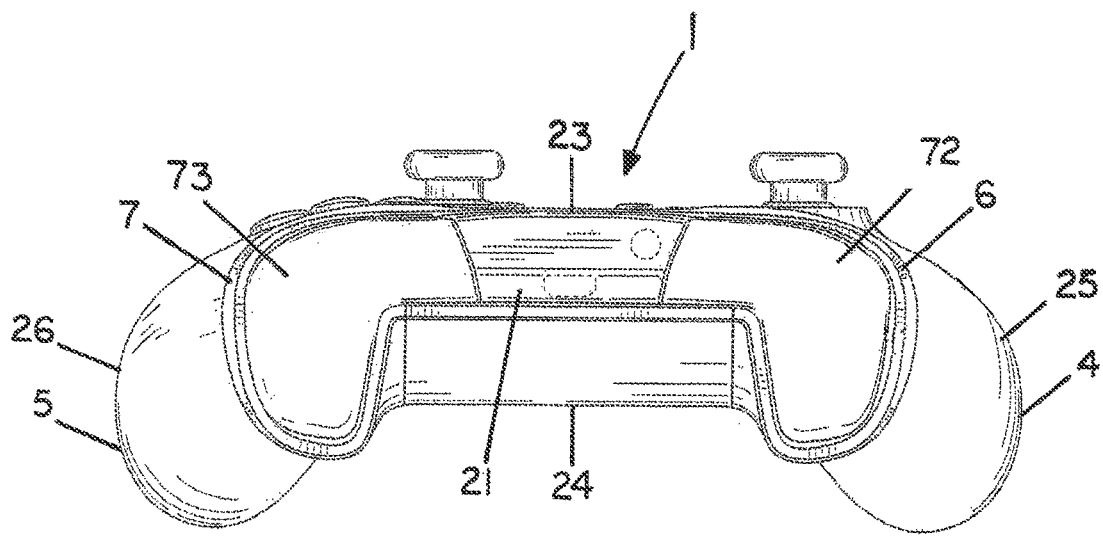
FIG. 35 is a front view of a game controller according to one embodiment generally similar to that shown in FIG. 33, but including a single touch pad on the right shoulder portion, and a single touch pad on the left shoulder portion for actuating control of game play.

FIG. 35 is front view of a game controller 1 according to one embodiment which can include controls and features resembling those shown on the top side 23 of the embodiment shown in FIG. 1, but which instead includes a single touch pad 73 on the on the right shoulder portion 7, and a single touch pad 72 on the left shoulder portion 6 for actuating control of game play. Each of the touch pads 72 and 73 can have multi-finger detection and control capability and can be mapped and selected for desired control functions and operations.

Figure 36:
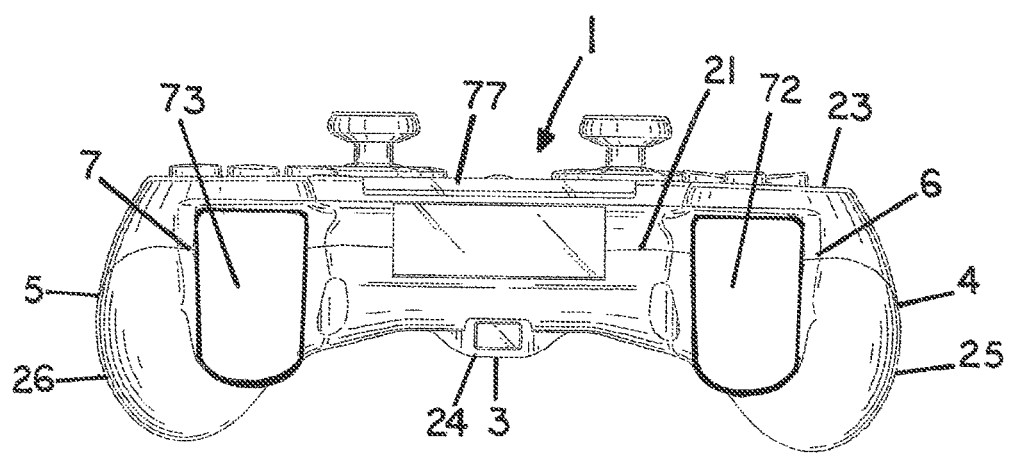
FIG. 36 is a front view of a game controller according to one embodiment generally similar to that shown in FIG. 34, but including a single touch pad on the right shoulder portion, and a single touch pad on the left shoulder portion for actuating control of game play.

FIG. 36 is front view of a game controller 1 according to one embodiment which can include controls and features resembling those shown on the top side 23 of the embodiment shown in FIG. 7, but which instead includes a single touch pad 73 on the on the right shoulder portion 7, and a single touch pad 72 on the left shoulder portion 6 for actuating control of game play. Each of the touch pads 72 and 73 can have multi-finger detection and control capability and can be mapped and selected for desired control functions and operations.

Figure 37:
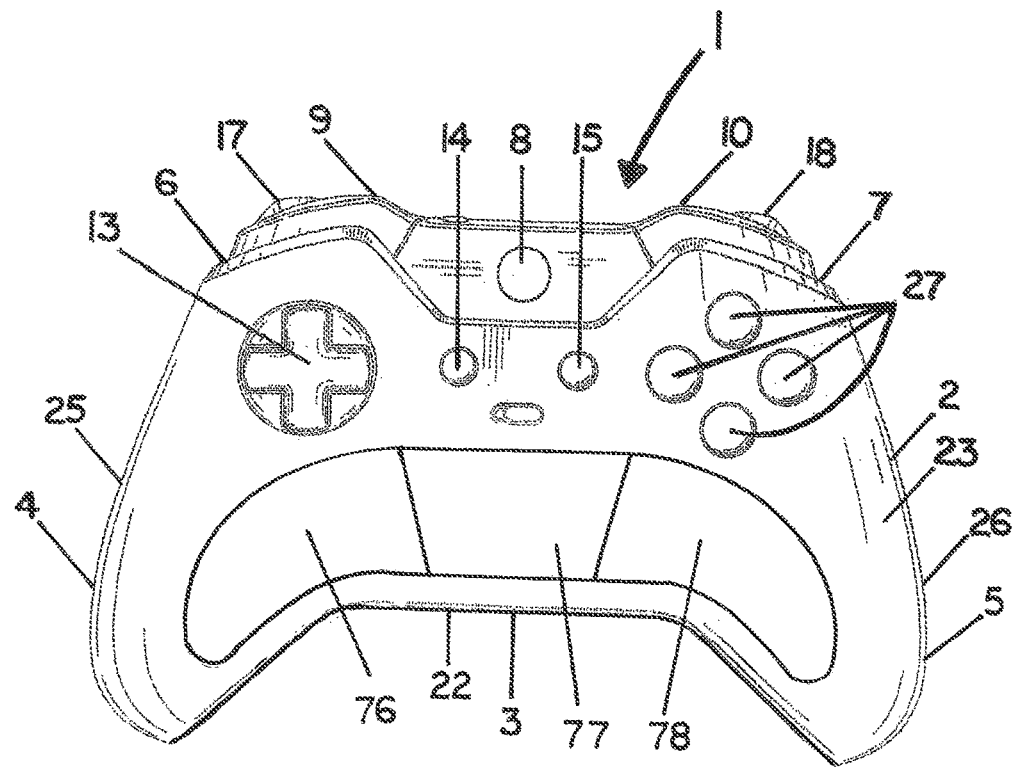
FIG. 37 is a top view of a game controller according to one embodiment including at least two touch pads and a touch screen on the top side of the game controller.

FIG. 37 is top view of a game controller 1 according to one embodiment including a left touch pad 76, a touch control screen 77, and a right touch pad 78 on the top side 23 of the game controller 1. The left touch pad 76 can perform the functions which have been associated with game controllers having a left thumbstick control and/or directional pad control, and right touch pad 78 can perform the functions which have been associated with a right thumbstick control and/or directional pad control. The touch control screen 77 located in the middle portion 3 of the game controller 1 can include a plurality of other menu selections and controls including but not limited to a left selection control, a right selection control, a mapping control, an on and off button, action button controls such as A, B, X, and Y, and then in various possible partial combinations and permutations, or in complete combination, as desired. In an alternative embodiment, the touch control screen 77 can be reduced in size, or alternatively, it can be eliminated so that the left touch pad 76 and right touch pad 78 which can serve as trackpads for use by a user's thumbs can extend more substantially and largely or completely divide the space in middle portion 3 of the game controller 1 on the top side 23 which is show as being occupied by the touch control screen 77.

FIG. 38 is top view of a game controller 1 according to one embodiment including a left touch pad 76, a touch screen 77, and a right touch pad 78 on the top side 23 of the game controller 1. Left touch pad 76 can perform the functions which have been associated with game controllers having a left thumbstick control and/or directional pad control, and right touch pad 78 can perform the functions which have been associated with a right thumbstick control and/or directional pad control. As previously discussed, the left touch pad 76 can be a pressure sensitive touch switch or touch pad which functions using electrical resistance such as the OHMITE round or donut shaped force sensing resistor product identified as FSP03CE, and the like, which can sense both pressure and position. As previously discussed, the right touch pad 78 can include one of the capacitive modules known as the ProxSense® GPIO Gesture Trackpads made by the Azoteq company of Austin, Texas, and the like. The touch screen 77 located in the middle portion 3 of the game controller 1 can include a plurality of other menu selections and controls including but not limited to a left selection control, a right selection control, a mapping control, an on and off button, action button controls such as A, B, X, and Y, and in various possible partial combinations and permutations, or in complete combination, as desired.

Figure 39:
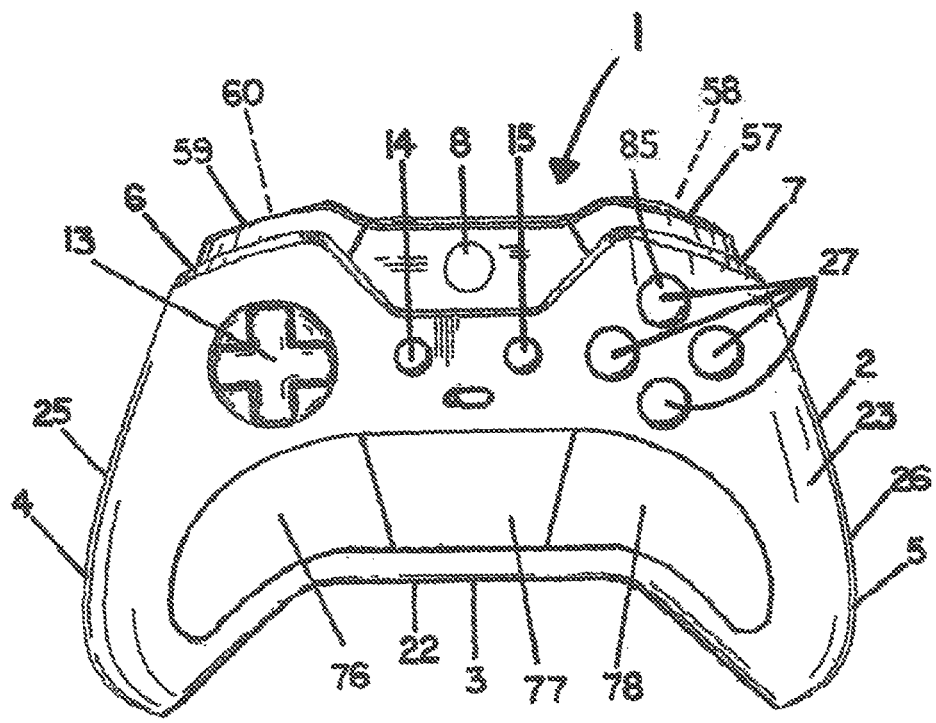
FIG. 39 is a top view a game controller according to one embodiment including at least two touch pads and a touch screen on the top side of the game controller as shown in FIG. 37, but which further includes a single touch pad on the on the right shoulder portion, and a single touch pad on the left shoulder portion as shown in FIG. 35, and also on the bottom side a single touch pad on the right handle portion, and a single touch pad on the left handle portion which have multi-finger detection and control capability and can be mapped and selected for desired control functions and operations.

FIG. 39 is a top view of a game controller 1 according to one embodiment including a left touch pad 76, a touch screen 77, and a right touch pad 78 on the top side 23 of the game controller 1 as shown in FIG. 37, and a touch pad 57 and also a touch pad 58 on the on the right shoulder portion 7, and a touch pad 59 and also a touch pad 60 on the left shoulder portion 6 as shown in FIG. 33, and on the bottom side 24 at least two of touch pads 61 and 62 on the right handle portion 5 and at least two of touch pads 66 and 67 on the left handle portion 4 for actuating control of game play as shown in FIG. 29. This alternative embodiment of a game controller 1 can provide numerous possible combinations and permutations regarding game controls and mapping options.

Figure 40:
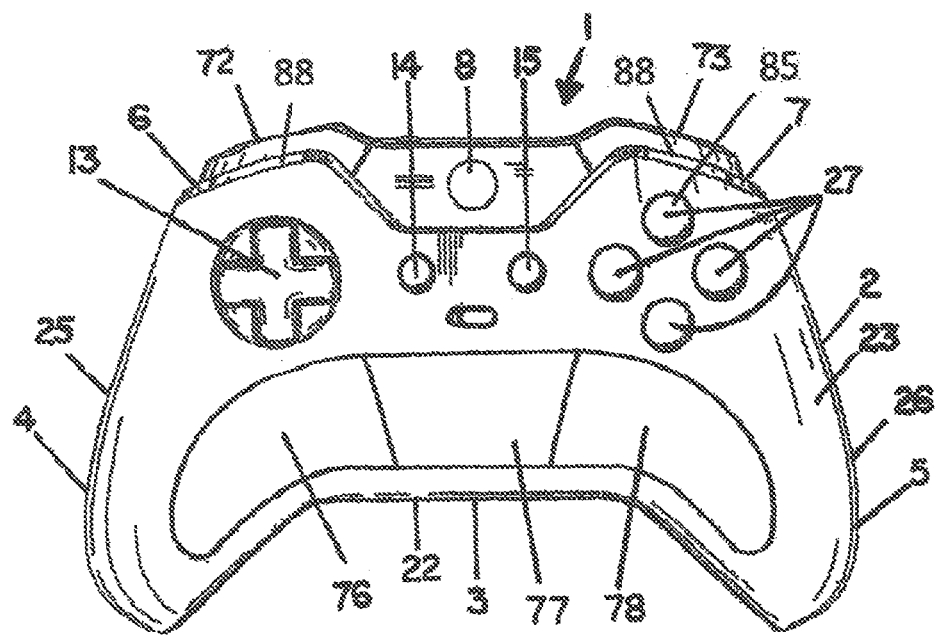
FIG. 40 is a top view of a game controller according to one embodiment including at least two touch pads and a touch screen on the top side of the game controller as shown in FIG. 37, and at least two touch pads on the on the right shoulder portion, and at least two touch pads on the left shoulder portion as shown in FIG. 33, and on the bottom side also includes at least two of touch pads on the right handle portion and at least two of touch pads on the left handle portion for actuating control of game play as shown in FIG. 29.

FIG. 40 is a top view a game controller 1 according to one embodiment including a left touch pad 76, a touch screen 77, and a right touch pad 78 on the top side 23 of the game controller 1 as shown in FIG. 37, but which further includes a single touch pad 73 and a conductive element 88 on the right shoulder portion 7, and a single touch pad 72 and a conductive element 88 on the left shoulder portion 6 as shown in FIG. 35, and also on the bottom side 24 a single touch pad 71 on the right handle portion 5, and a single touch pad 72 on the left handle portion 4 which each have multi-finger detection and control capability and can be mapped and selected for desired control functions and operations as shown and discussed above in connection with FIG. 31.

Figure 41:
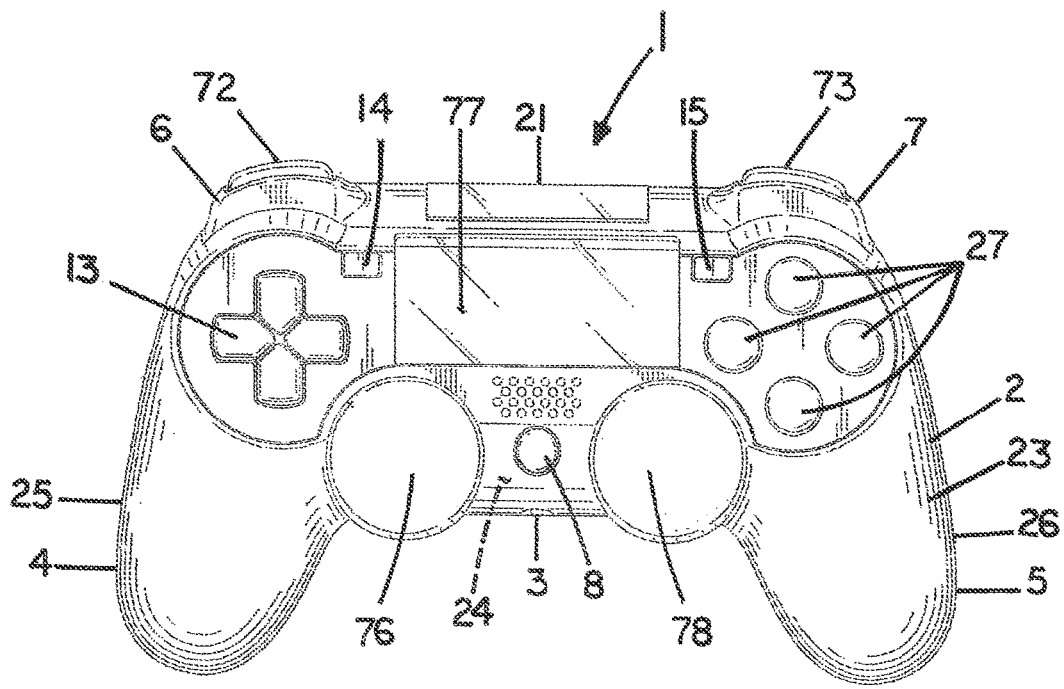
FIG. 41 is a perspective view of a game controller according to one embodiment including at least two touch pads and a touch screen on the top side of the game controller similar to that shown in FIG. 38, and further includes a single touch pad on the right shoulder portion and a single touch pad on the left shoulder portion as shown in FIG. 36, and also on the bottom side includes a single touch pad on the right handle portion, and a single touch pad on the left handle portion as shown in FIG. 32 which each have multi-finger detection and control capability and can be mapped and selected for desired control functions and operations.

FIG. 41 is a perspective view of a game controller 1 according to one embodiment including a left touch pad 76, a touch screen 77, and a right touch pad 78 on the top side 23 of the game controller 1 similar to that shown in FIG. 38, and further includes a single touch pad 73 on the right shoulder portion 7, and a single touch pad 72 on the left shoulder portion 6 as shown in FIG. 36, and on the bottom side 24 includes a single touch pad 71 on the right handle portion 5, and a single touch pad 72 on the left handle portion 4 as shown in FIG. 32 which each have multi-finger detection and control capability and can be mapped and selected for desired control functions and operations, as shown and discussed above in connection with FIG. 31.

Figure 42:
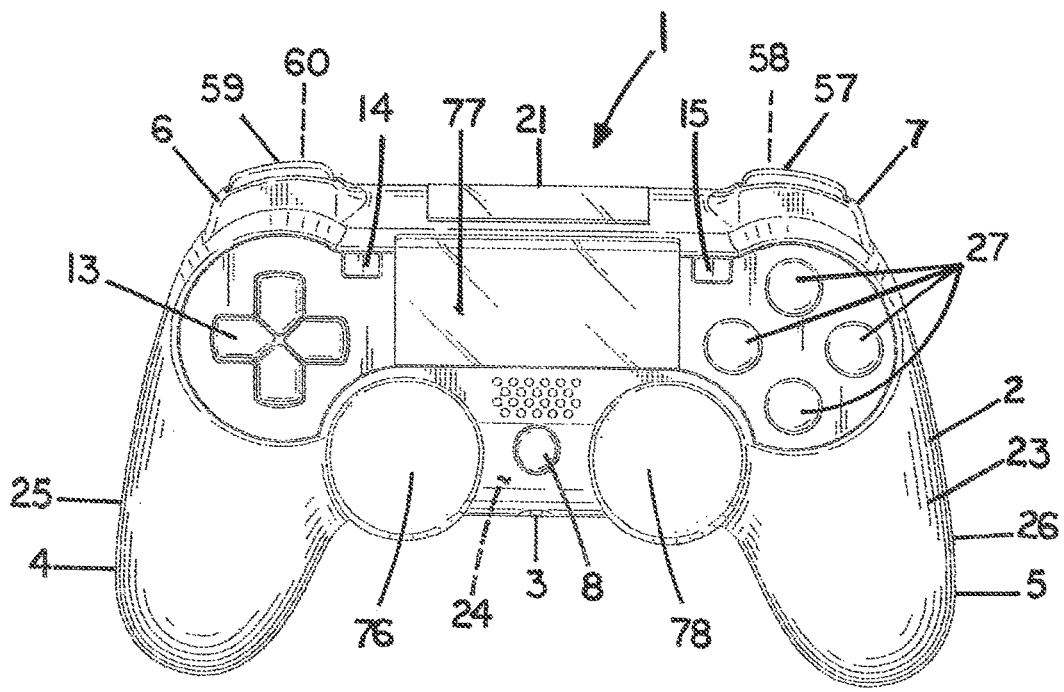
FIG. 42 is a top view of a game controller according to one embodiment including at least two touch pads and a touch screen on the top side of the game controller as shown in FIG. 38, and at least two touch pads on the right shoulder portion, and at least two touch pads on the left shoulder portion as shown in FIG. 34, and on the bottom side also includes at least two of touch pads on the right handle portion and at least two of touch pads on the left handle portion for actuating control of game play as shown in FIG. 28.

FIG. 42 is a top view of a game controller 1 according to one embodiment including a left touch pad 76, a left directional pad control 13, a touch screen 77, and a right touch pad 78 on the top side 23 of the game controller 1. The left touch pad 76 and/or left directional pad control 13 can be made of a pressure sensitive resistive touch pad like the FSP03CE made by the OHMITE company, and the right touch pad 78 can be made of a capacitive touch pad like the TPR 48 made by the Azoteq company. Other combinations and permutations including pressure sensitive touch switches and/or touch pads can be used. The game controller 1 includes a touch pad 57 and also a touch pad 58 on the right shoulder portion 7, and a touch pad 69 and also a touch pad 70 on the left shoulder portion 6, and the bottom side 24 also includes at least two touch pads 61 and 62 on the right handle portion 5 and at least two of touch pads 66 and 67 on the left handle portion 4 for actuating control of game play. This alternative embodiment of a game controller 1 can also include and provide numerous possible combinations and permutations regarding game controls and mapping options.

Figure 43:
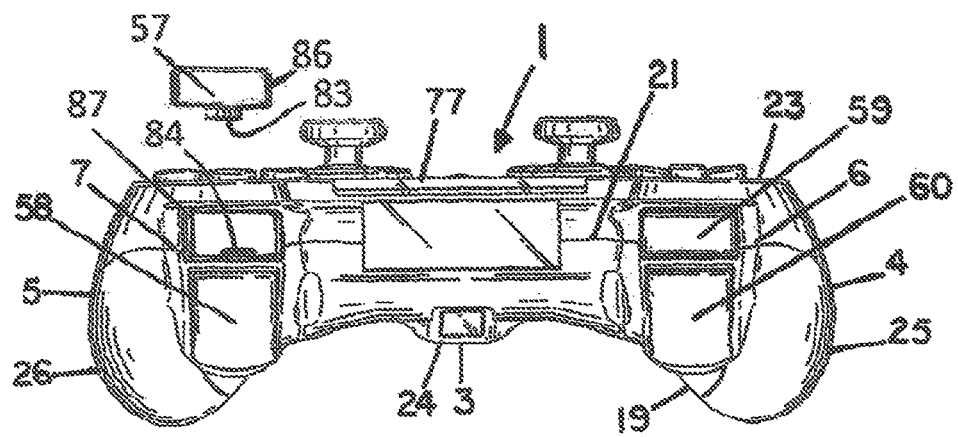
FIG. 43 is front view of a modular game controller according to one embodiment including at least two touch pads on the right shoulder portion, and also two touch pads on the left shoulder portion for actuating control of game play which can be selected by an individual for use and removably secured in order to customize the structure and performance of the game controller.

FIG. 43 is front view of a modular game controller 1 according to one embodiment which includes a touch pad 57 and also a touch pad 58 on the right shoulder portion 7, and a touch pad 59 and also a touch pad 60 on the left shoulder portion 6 for actuating control of game play which can be selected by an individual for use and removably secured in order to customize the structure and performance of the game controller 1. The touch pads 57, 58, 59, and 60 and case 2 include tongue structures 86 and groove structures 87, snap fit, and/or other mechanically mating structures which permit the touch pads to be inserted and/or slide into place and then be removably secured in functional relation to the game controller 1. For example, as shown on the left side of drawing FIG. 43, the touch pad 57 is shown removed from its location on the front side 21 of the case 2 of the game controller 1. This touch pad 57 includes tongue structures 86 on both of its left and right sides for mating with corresponding groove structures 87 which are included in the case 2 for receiving these tongue structures 86 and permitting the touch pad 57 to be removably secured. The touch pad 57 also includes a male electrical connector 83 which can mate with a corresponding female electrical connector 84 which is coupled to the case 2 of the game controller 1, that is, when the touch pad 57 is inserted and/or slid into place and removably secured to the case 2 of the game controller 1. Accordingly, the touch pads for use can be selected, changed, and customized by an individual for game play. For example, touch pads 57, 58, 59, and 60 could be force sensing potentiometers also known as pressure sensitive touch switches and/or touch pads which sense force and/or position and use variable resistance induced by the finger pressure of an individual to control movement and/or other action in a video game, as previously discussed herein. Alternatively, touch pads 57, 58, 59, and 60 could be touch switches and/or touch pads which are capacitive instead of pressure sensitive, and which can sense touch and/or position and/or movement as previously discussed herein. Alternatively, touch pads 57 and 59 could be touch switches and/or touch pads which are pressure sensing and use variable resistance, and touch pads 58 and 60 could be touch switches and/or touch pads which are capacitive instead of pressure sensitive, and vice-versa, that is, touch pads 57 and 59 could be capacitive and touch pads 58 and 60 could be pressure sensitive. Accordingly, different pressure sensitive and/or different capacitive touch pads having different sensitivities and trigger thresholds can be selected for use by an individual to customize the structure and performance of the game controller 1.

Figure 44:
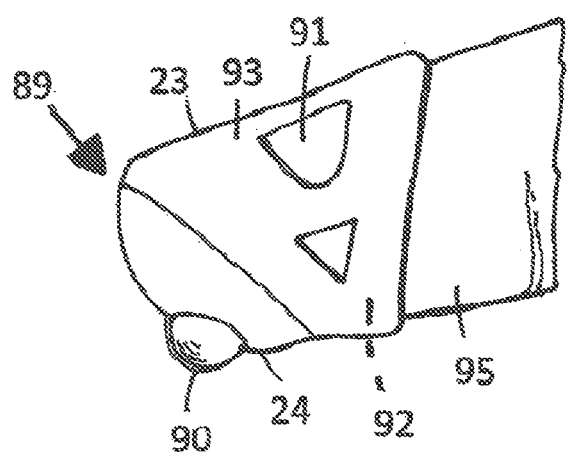
FIG. 44 is a side view of a stylus that is made at least in part of a plastics and/or rubber material for use on a finger and/or thumb of an individual with a touch pad and/or touch screen on a computer, pad, or game controller.

FIG. 44 is a side view of stylus 89 that is made at least in part of a plastic and/or rubber material for use on one or more of the fingers 95 and/or thumb of an individual with a touch pad and/or touch screen on a computer, pad, or game controller. The stylus 89 has a top side 23 and includes an enclosure 93 made of a plastic and/or rubber material which includes openings 91 and forms a pocket 92 for receiving a finger 95 or thumb of an individual wearer, and also includes a ball 90 that is electrically conductive largely disposed on the bottom side 24.

Figure 45:
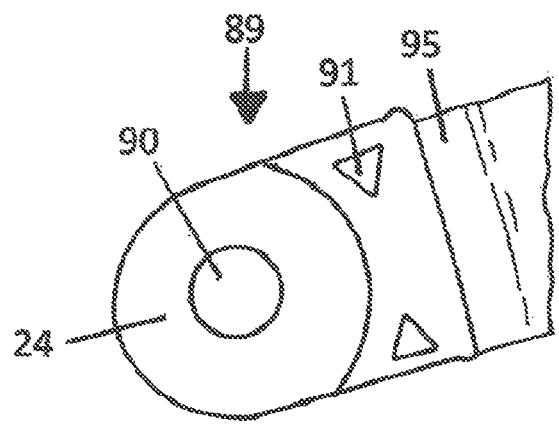
FIG. 45 is a bottom view of the stylus shown in FIG. 44 for use on a finger and/or thumb of an individual with a touch pad and/or touch screen on a computer, pad, or game controller.

FIG. 45 is a bottom view of the stylus 89 shown in FIG. 44 for use on one or more of the fingers 95 and/or thumb of an individual with a touch pad and/or touch screen on a computer, pad, or game controller. Shown are two openings 90 in the enclosure 93 and an electrically conductive ball 90 that is largely disposed on the bottom side 24 of the stylus 89.

Figure 46:
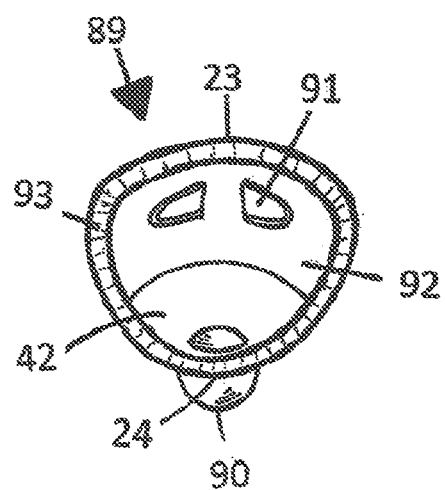
FIG. 46 is an inside view of the stylus shown in FIG. 44 for use on a finger and/or thumb of an individual with a touch pad and/or touch screen on a computer, pad, or game controller.

FIG. 46 is an inside view of the stylus 89 shown in FIG. 46 for use on one or more of the fingers 95 and/or thumb of an individual with a touch pad and/or touch screen on a computer, pad, or game controller. The stylus 89 includes an enclosure 93 which forms a pocket 92 for receiving a finger 95 or thumb of an individual wearer and includes a plurality of openings 91 for providing ventilation. As shown, a portion of the ball 90 is exposed and can be seen in the interior side 42 so that it can be placed in electrical communication with a wearer, but also to enhance the tactile and proprioceptive sensitivity and feedback provided to and experienced by an individual during its use and game play.

It can be readily understood from the disclosure contained in the specification and drawings of this patent application that action keys 27, left selection control 14, right selection control 15, mapping preset control 16, on/off control 8, directional pad control 13, and other controls can be made using resistive force sensitive touch controls or switches, and/or the aforementioned controls or switches can be made using capacitive touch controls instead of mechanical controls and/or switches. Further, it can be readily understood that resistive force sensitive touch controls or switches, capacitive touch controls or switches, and mechanical controls or switches can be used in various partial or complete combinations. In order to avoid the possibility of the aforementioned controls and/or switches being unintentionally selected or triggered, these controls will typically be made using mechanical controls and/or switches, or resistive force sensitive touch controls or switches. Further, the status and sensitivity of these controls or switches can be set and adjusted by an individual as desired with the use of a settings menu which can be made to appear on a touch screen 77.

It can be readily understood from the disclosure contained in the specification and drawings of this patent application that resistive force sensitive touch controls and/or capacitive touch controls can be used in a game controller instead of the conventional mechanical left bumper and left trigger controls and right bumper and right trigger controls which have been disposed on the shoulders and proximate to or on the front side of a conventional game controller. However, the use of resistive force sensitive touch controls can be advantageous for use on a game controller 1 when the habit or desire of an individual is to keep one or more of their fingers resting on bumper and trigger controls during game play. Accordingly, the use of resistive force sensitive touch controls can be advantageous for use regarding the bumper and trigger controls disposed on or proximate the shoulders and the front side of a game controller, e.g., as shown in drawing FIGS. 34 and 42 and indicated by numerals 57, 58, 59, and 60. The force required to trigger a resistive pressure sensitive touch control is typically in the range of between about 10-50 grams per square centimeter, and in particular, the typical range is in the range between about 15-30 grams per square centimeter. The status and sensitivity of these controls or switches can also be set and adjusted by an individual as desired with the use of a settings menu which can be made to appear on a touch screen 77, e.g., as shown in drawing FIG. 42, and/or by an individual making selections as desired and removably replacing these touch controls as shown and discussed in connection with drawing FIG. 43.

It can be readily understood from the disclosure contained in the specification and drawings of this patent application that a single touch pad can register the touch of multiple fingers and that a game controller can be configured and/or programmed to identify the individual finger and/or thumb touches and also link or otherwise associate them with specific desired commands, movements, or other actions when using a game controller. A single touch pad can be resistive and force sensitive and one or more touches be recognized by actual physical contact. Alternatively, a single touch pad can be capacitive and one or more fingers and/or thumbs of an individual can cause desired commands, movements, or other action to be selected by proximate movement or actual physical touches upon a touch pad, or electrically conductive portion of the case of a game controller. Alternatively, a single touch pad can be optical and one or more fingers and/or thumbs of an individual can cause desired commands, movements, or other action to be selected by proximate movements or actual physical touches upon a touch pad, or portion of the case of a game controller.

It can be readily understood from the disclosure contained in the specification and drawings of this patent application that resistive force sensitive touch controls and/or capacitive touch controls, and/or mechanical controls can be used on the bottom side 24 of a game controller 1.

It can be readily understood from the disclosure contained in the specification and drawings of this patent application that the left joystick 11 and/or right joystick 12 controls which are often found and used on conventional game controllers can be partially or completely omitted in making a game controller, and instead one or more resistive force sensitive touch pads and/or capacitive touch pads can be disposed and used on the top side 23 of a game controller, and the status and sensitivity of such touch pads can be set and adjusted by an individual as desired with the use of a settings menu which can be made to appear on a touch screen 77. Further, the speed and/or accuracy of an individual's desired selections, movements, and actions in game play when using one or more touch pads disposed on the top side 23 of a game controller 1 can possibly be enhanced and improved with the use of a stylus 89 which can be worn on one or more of the individual's fingers and/or thumbs, as discussed and shown in drawing FIGS. 44-46.

Many other possible combinations and permutations of the structures and features which are shown and disclosed in the present application and also in the patents and patent applications which have been incorporated by reference herein are possible.

The game controllers may be coupled to a games console, computer, or games platform by a wire cable and connection, a fiber optical cable and connection, or by a wireless connection device. Further the game controllers may be coupled to a games platform online using the Internet by a wire connection, a fiber optical cable connection, or by a wireless connection device.

This disclosure may find application outside of game controllers, and may be applied to the mode of operation of other devices.

It can be readily understood that as used herein, structural, spatial, directional and other references with respect to a game controller such as "top side," "bottom side," "front side," "rear side," "left side," "right side," "interior side," and "exterior side" do not necessarily limit the respective features to such orientation, but merely serve to distinguish these features from one another. Further, it can be readily understood that reference to the left, right, top, and bottom sides can be used to indicate the location of corresponding surfaces on the exterior side of a game controller.

The following Clauses provide exemplary configurations for a game controller described above and/or methods of making and operating a game controller.

Clause 1: A game controller comprising: a case comprising a top side, a bottom side, a front side, a rear side, a left side, a left shoulder portion, a left handle portion, a right side, a right shoulder portion, a right handle portion, and a middle portion; and a plurality of touch controls supported by the case, the plurality of touch controls comprising a first electrically resistive pressure sensitive touch control disposed proximate said left shoulder portion, a second electrically resistive pressure sensitive touch control disposed proximate said left shoulder portion, said first electrically resistive pressure sensitive touch control disposed above said second electrically resistive pressure sensitive touch control and proximate said top side, said second electrically resistive pressure sensitive touch control disposed below said first electrically resistive pressure sensitive touch control and proximate said bottom side, a third electrically resistive pressure sensitive touch control disposed proximate said right shoulder portion, and a fourth electrically resistive pressure sensitive touch control disposed proximate said right shoulder portion, said third electrically resistive pressure sensitive touch control disposed above said fourth electrically resistive pressure sensitive touch control and proximate said top side, said fourth electrically resistive pressure sensitive touch control disposed below said third electrically resistive pressure sensitive touch control and proximate said bottom side.

Clause 2: The game controller according to claim 1, wherein the range of force required to actuate each of said first electrically resistive pressure sensitive touch control, said second electrically resistive pressure sensitive touch control, said third electrically resistive pressure sensitive touch control, and said fourth electrically resistive pressure sensitive touch control is in the range between 10-50 grams when measured pursuant to ASTM 1578.

Clause 3: The game controller according to claim 1, wherein the range of force required to actuate each of said first electrically resistive pressure sensitive touch control, said second electrically resistive pressure sensitive touch control, said third electrically resistive pressure sensitive touch control, and said fourth electrically resistive pressure sensitive touch control is in the range between 15-30 grams when measured pursuant to ASTM 1578.

Clause 4: The game controller according to claim 1, wherein at least two of said first electrically resistive pressure sensitive touch control, said second electrically resistive pressure sensitive touch control, said third electrically resistive pressure sensitive touch control, and said fourth electrically resistive pressure sensitive touch control, comprises means for selectively adjusting the sensitivity of said at least two of said electrically resistive first pressure sensitive touch control, said second electrically resistive pressure sensitive touch control, said third electrically resistive pressure sensitive touch control, and, said fourth electrically resistive pressure sensitive touch control.

Clause 5: The game controller according to claim 1, wherein the plurality of touch controls comprises a fifth touch control disposed on said left handle portion, and a sixth touch control disposed on said right handle portion, wherein each of said fifth touch control and said sixth touch control is configured to distinguish a touch of multiple independent fingers, each touch being configured to initiate a command.

Clause 6: The game controller according to claim 1, wherein the plurality of touch controls comprises a seventh touch control disposed on said middle portion proximate to said left handle portion, and an eighth touch control disposed on said middle portion proximate to said right handle portion.

Clause 7: The game controller according to claim 1, wherein the plurality of touch controls further comprises a touch pad control disposed on said middle portion on said top side.

Clause 8: The game controller according to claim 1, and further comprising at least one thumbstick control comprising a push button control, said at least one thumbstick control being supported by the case.

Clause 9: The game controller according to claim 1, and further comprising at least two thumbstick controls located on said top side of said case and arranged in a symmetrical or asymmetrical configuration relative to said left handle portion, said middle portion, and said right handle portion.

Clause 10 The game controller according to claim 1, and further comprising a plurality of other additional controls selected from the group consisting of: an on/off control, a keyboard control, a master control, a menu control, a control remapping control, a camera control, a chat control, at least one shift control, at least one bumper control, at least one trigger control, at least one hair trigger lock control, at least one sensitivity control, at least one cross-shaped directional control, at least one paddle control, at least one push button control, at least one touch screen control, at least one touch pad control, at least one joystick control, at least one thumbstick control, and, at least one action button control.

Clause 11. The game controller according to claim 1, and further comprising means for communication with at least one of a game console and a game platform, said means for communication selected from the group consisting of: a wire, a fiber optic cable, and a wireless connection.

Clause 12: A game controller comprising: a case comprising a top side, a bottom side, a front side, a rear side, a left side, a left shoulder portion, a left handle portion, a right side, a right shoulder portion, a right handle portion, and a middle portion; and a plurality of capacitive controls supported by the case, the plurality of capacitive controls comprising a first capacitive control disposed proximate said left shoulder portion, a second capacitive control disposed proximate said left shoulder portion, said first capacitive control disposed above said second capacitive control and proximate said top side, said second capacitive control disposed below said first capacitive control and proximate said bottom side, a third capacitive control disposed proximate said right shoulder portion, and a fourth capacitive control disposed proximate said right shoulder portion, said third capacitive control disposed above said fourth capacitive control and proximate said top side, said fourth capacitive control disposed below said third capacitive control and proximate said bottom side.

Clause 13: The game controller according to claim 12, wherein the range of the distance required to actuate each of said first capacitive control, said second capacitive control, said third capacitive control, and said fourth capacitive control is in the range between and including direct contact of a finger of a user and a distance of said finger of said user equal to or less than ¼ inch or 6.35 mm from each of said first capacitive control, said second capacitive control, said third capacitive control, and said fourth capacitive control.

Clause 14: The game controller according to claim 12, wherein the range of the distance required to actuate each of said first capacitive control, said second capacitive control, said third capacitive control, and said fourth capacitive control is in the range between and including direct contact of a finger of a user and a distance of said finger of said user equal to or less than ⅛ths inch or 3.175 mm from each of said first capacitive control, said second capacitive control, said third capacitive control, and said fourth capacitive control.

Clause 15: The game controller according to claim 12, wherein at least two of said first capacitive control, said second capacitive control, said third capacitive control, and said fourth capacitive control, comprises means for selectively adjusting the sensitivity of said at least two of said first capacitive control, said second capacitive control, said third capacitive control, and said fourth capacitive control.

Clause 16: A game controller comprising: a case comprising a top side, a bottom side, a front side, a rear side, a left side, a left shoulder portion, a left handle portion, a right side, a right shoulder portion, a right handle portion, and a middle portion; and a plurality of controls supported by the case, the plurality of controls comprising a first control disposed proximate said left shoulder portion, a second control disposed proximate said left shoulder portion, said first control disposed above said second control and proximate said top side, said second control disposed below said first control and proximate said bottom side, a third control disposed proximate said right shoulder portion, and a fourth control disposed proximate said right shoulder portion, said third control disposed above said fourth control and proximate said top side, said fourth control disposed below said third control and proximate said bottom side, wherein at least two of said first control, said second control, said third control, and said fourth control comprise electrically resistive pressure sensitive touch controls, and at least two of said first control, said second control, said third control, and said fourth control comprise capacitive controls.

Clause 17: The game controller according to claim 16, wherein the range of force required to actuate each of said at least two electrically resistive pressure sensitive controls is in the range between 10-50 grams when measured pursuant to ASTM 1578.

Clause 18: The game controller according to claim 16, wherein the range of the distance required to actuate one of said at least two capacitive controls is in the range between and including direct contact of a finger of a user and a distance of said finger of said user equal to or less than ¼ inch or 6.35 mm from said one of said at least two capacitive controls.

Clause 19: The game controller according to claim 16, wherein the range of the distance required to actuate one of said at least two capacitive controls is in the range between and including direct contact of a finger of a user and a distance of said finger of said user equal to or less than ⅛ths inch or 3.175 mm from said one of said at least two capacitive controls.

Clause 20: The game controller according to claim 16, wherein said at least two capacitive controls and said at least two electrically resistive pressure sensitive controls comprises means for selectively adjusting the sensitivity of said at least two capacitive controls and said at least two electrically resistive pressure sensitive controls.

Clause 21: The game controller according to Clause 1, wherein said first electrically resistive pressure sensitive touch control comprises a first bumper control, said second electrically resistive pressure sensitive touch control comprises a first trigger control, said third electrically resistive pressure sensitive touch control comprises a second bumper control, and said fourth electrically resistive pressure sensitive touch control comprises a second trigger control.

Clause 22: The game controller according to Clause 12, wherein said first capacitive touch control comprises a first bumper control, said second capacitive control comprises a first trigger control, said third capacitive control comprises a second bumper control, and said fourth capacitive control comprises a second trigger control.

Clause 23: The game controller according to Clause 12, wherein said first capacitive touch control comprises a first trigger control, said second capacitive control comprises a first bumper control, said third capacitive control comprises a second trigger control, and said fourth capacitive control comprises a second bumper control.

Clause 24: The game controller according to Clause 16, wherein said electrically resistive pressure sensitive touch controls comprise bumper controls, and said capacitive controls comprise trigger controls.

Clause 25: The game controller according to Clause 16, wherein said electrically resistive pressure sensitive touch controls comprise trigger controls, and said capacitive controls comprise bumper controls.

Clause 26: The game controller according to Clause 1, wherein said left handle portion and said right handle portion each comprises at least one customizable and selectively removable grip portion.

Clause 27: The game controller according to Clause 12, and further comprising a plurality of removable gates each including an opening having a different geometric shape configured to be positioned about the at least one thumbstick control, such that the play of said at least one thumbstick control can be customized.

Clause 28: The game controller according to Clause 14, wherein the opening in each of said plurality of removable gates comprises a geometric shape selected from the group of geometric shapes consisting of: a circular shape, an octagonal shape, a square shape, and a diamond shape.

Clause 29: The game controller according to Clause 14, wherein said case further comprises a receptacle configured to couple with a retaining ring configured to removably secure at least one of said plurality of removable gates.

While the above detailed description of the invention contains many specificities, these should not be construed as limitations on the scope of the invention, but rather as exemplifications of several preferred embodiments thereof. Although the present invention has been described with reference to preferred embodiments, workers skilled in the art will recognize that changes may be made in form and detail without departing from the spirit and scope of the invention. The disclosed structures and features of a game controller, and also its related functions and methods of play may be combined in various partial or complete combinations and permutations. Accordingly, the scope of the invention should be determined not by the embodiments discussed or illustrated, but by the appended claims and their legal equivalents.

Although the present invention has been described with reference to preferred embodiments, workers skilled in the art will recognize that changes may be made in form and detail without departing from the spirit and scope of the invention.

What is claimed is:

1. A game controller comprising:
   a case comprising a top side, a bottom side, a front side, a rear side, a left side, a left shoulder portion, a left handle portion, a right side, a right shoulder portion, a right handle portion, and a middle portion; and
   a plurality of touch controls supported by the case, the plurality of touch controls comprising a first electrically resistive pressure sensitive touch control disposed proximate said left shoulder portion, a second electrically resistive pressure sensitive touch control disposed proximate said left shoulder portion, said first electrically resistive pressure sensitive touch control disposed above said second electrically resistive pressure sensitive touch control and proximate said top side, said second electrically resistive pressure sensitive touch control disposed below said first electrically resistive pressure sensitive touch control and proximate said bottom side, a third electrically resistive pressure sensitive touch control disposed proximate said right shoulder portion, and a fourth electrically resistive pressure sensitive touch control disposed proximate said right shoulder portion, said third electrically resistive pressure sensitive touch control disposed above said fourth electrically resistive pressure sensitive touch control and proximate said top side, said fourth electrically resistive pressure sensitive touch control disposed below said third electrically resistive pressure sensitive touch control and proximate said bottom side.

2. The game controller according to claim 1, wherein the range of force required to actuate each of said first electrically resistive pressure sensitive touch control, said second electrically resistive pressure sensitive touch control, said third electrically resistive pressure sensitive touch control, and said fourth electrically resistive pressure sensitive touch control is in the range between 10-50 grams when measured pursuant to ASTM 1578.

3. The game controller according to claim 1, wherein the range of force required to actuate each of said first electrically resistive pressure sensitive touch control, said second electrically resistive pressure sensitive touch control, said third electrically resistive pressure sensitive touch control, and said fourth electrically resistive pressure sensitive touch control is in the range between 15-30 grams when measured pursuant to ASTM 1578.

4. The game controller according to claim 1, wherein at least two of said first electrically resistive pressure sensitive touch control, said second electrically resistive pressure sensitive touch control, said third electrically resistive pressure sensitive touch control, and said fourth electrically resistive pressure sensitive touch control, comprises means for selectively adjusting the sensitivity of said at least two of said electrically resistive first pressure sensitive touch control, said second electrically resistive pressure sensitive touch control, said third electrically resistive pressure sensitive touch control, and, said fourth electrically resistive pressure sensitive touch control.

5. The game controller according to claim 1, wherein the plurality of touch controls comprises a fifth touch control disposed on said left handle portion, and a sixth touch control disposed on said right handle portion, wherein each of said fifth touch control and said sixth touch control is configured to distinguish a touch of multiple independent fingers, each touch control being configured to initiate a command.

6. The game controller according to claim 1, wherein the plurality of touch controls comprises a seventh touch control disposed on said middle portion proximate to said left handle portion, and an eighth touch control disposed on said middle portion proximate to said right handle portion.

7. The game controller according to claim 1, wherein the plurality of touch controls further comprises a touch pad control disposed on said middle portion on said top side.

8. The game controller according to claim 1, and further comprising at least one thumbstick control comprising a push button control, said at least one thumbstick control being supported by the case.

9. The game controller according to claim 1, and further comprising at least two thumbstick controls located on said top side of said case and arranged in a symmetrical or asymmetrical configuration relative to said left handle portion, said middle portion, and said right handle portion.

10. The game controller according to claim 1, and further comprising a plurality of other additional controls selected from the group consisting of: an on/off control, a keyboard control, a master control, a menu control, a control remapping control, a camera control, a back control, a chat control, at least one shift control, at least one bumper control, at least one trigger control, at least one hair trigger lock control, at least one sensitivity control, at least one cross-shaped directional control, at least one paddle control, at least one push button control, at least one touch screen control, at least one touch pad control, at least one joystick control, at least one thumbstick control, and, at least one action button control.

11. The game controller according to claim 1, and further comprising means for communication with at least one of a game console and a game platform, said means for communication selected from the group consisting of: a wire, a fiber optic cable, and a wireless connection.

12. A game controller comprising:
a case comprising a top side, a bottom side, a front side, a rear side, a left side, a left shoulder portion, a left handle portion, a right side, a right shoulder portion, a right handle portion, and a middle portion; and
a plurality of capacitive controls supported by the case, the plurality of capacitive controls comprising a first capacitive control disposed proximate said left shoulder portion, a second capacitive control disposed proximate said left shoulder portion, said first capacitive control disposed above said second capacitive control and proximate said top side, said second capacitive control disposed below said first capacitive control and proximate said bottom side, a third capacitive control disposed proximate said right shoulder portion, and a fourth capacitive control disposed proximate said right shoulder portion, said third capacitive control disposed above said fourth capacitive control and proximate said top side, said fourth capacitive control disposed below said third capacitive control and proximate said bottom side.

13. The game controller according to claim 12, wherein the distance required to actuate each of said first capacitive control, said second capacitive control, said third capacitive control, and said fourth capacitive control is in the range between and including direct contact of a finger of a user and a distance of said finger of said user equal to or less than ¼ inch or 6.35 mm from each of said first capacitive control, said second capacitive control, said third capacitive control, and said fourth capacitive control.

14. The game controller according to claim 12, wherein the distance required to actuate each of said first capacitive control, said second capacitive control, said third capacitive control, and said fourth capacitive control is in the range between and including direct contact of a finger of a user and a distance of said finger of said user equal to or less than ⅛ths inch or 3.175 mm from each of said first capacitive control, said second capacitive control, said third capacitive control, and said fourth capacitive control.

15. The game controller according to claim 12, wherein at least two of said first capacitive control, said second capacitive control, said third capacitive control, and said fourth capacitive control, comprises means for selectively adjusting the sensitivity of said at least two of said first capacitive control, said second capacitive control, said third capacitive control, and said fourth capacitive control.

16. A game controller comprising:
a case comprising a top side, a bottom side, a front side, a rear side, a left side, a left shoulder portion, a left handle portion, a right side, a right shoulder portion, a right handle portion, and a middle portion; and
a plurality of controls supported by the case, the plurality of controls comprising a first control disposed proximate said left shoulder portion, a second control disposed proximate said left shoulder portion, said first control disposed above said second control and proximate said top side, said second control disposed below said first control and proximate said bottom side, a third control disposed proximate said right shoulder portion, and a fourth control disposed proximate said right shoulder portion, said third control disposed above said fourth control and proximate said top side, said fourth control disposed below said third control and proximate said bottom side, wherein at least two of said first control, said second control, said third control, and said fourth control comprise electrically resistive pressure sensitive touch controls, and at least two of said first control, said second control, said third control, and said fourth control comprise capacitive controls.

17. The game controller according to claim 16, wherein the range of force required to actuate each of said at least two electrically resistive pressure sensitive controls is in the range between 10-50 grams when measured pursuant to ASTM 1578.

18. The game controller according to claim 16, wherein the distance required to actuate one of said at least two capacitive controls is in the range between and including direct contact of a finger of a user and a distance of said finger of said user equal to or less than ¼ inch or 6.35 mm from said one of said at least two capacitive controls.

19. The game controller according to claim 16, wherein the distance required to actuate one of said at least two capacitive controls is in the range between and including direct contact of a finger of a user and a distance of said finger of said user equal to or less than ⅛ths inch or 3.175 mm from said one of said at least two capacitive controls.

20. The game controller according to claim 16, wherein said at least two capacitive controls and said at least two electrically resistive pressure sensitive controls comprises means for selectively adjusting the sensitivity of said at least two capacitive controls and said at least two electrically resistive pressure sensitive controls.

21. The game controller according to claim 1, wherein said case further comprises a plurality of receptacles each receptacle comprising a first portion of a mechanical coupling and a first portion of a two-part electrical connector, and at least two of said first control, said second control, said third control, and said fourth control each comprise a second portion of said mechanical coupling and a second portion of said two-part electrical connector such that at least two of said first control, said second control, said third control, and said fourth control are configured to be removed and replaced.

22. The game controller according to claim 21, wherein said mechanical coupling comprises at least one of a tongue structure, a groove structure, and/or at least one snap fit structure.

23. The game controller according to claim 21, wherein at least two of said first control, said second control, said third control, and said fourth control comprise bumper controls, and at least two of said first control, said second control, said third control, and said fourth control comprise trigger controls.

24. The game controller according to claim 12, wherein said case further comprises a plurality of receptacles each receptacle comprising a first portion of a mechanical coupling and a first portion of a two-part electrical connector, and at least two of said first control, said second control, said third control, and said fourth control each comprise a second portion of said mechanical coupling and a second portion of said two-part electrical connector such that at least two of said first control, said second control, said third control, and said fourth control are configured to be removed and replaced.

25. The game controller according to claim 24, wherein said mechanical coupling comprises at least one of a tongue structure, a groove structure, and/or at least one snap fit structure.

26. The game controller according to claim 24, wherein at least two of said first control, said second control, said third control, and said fourth control comprise bumper controls, and at least two of said first control, said second control, said third control, and said fourth control comprise trigger controls.

27. The game controller according to claim 16, wherein said case further comprises a plurality of receptacles each receptacle comprising a first portion of a mechanical coupling and a first portion of a two-part electrical connector, and at least two of said first control, said second control, said third control, and said fourth control each comprise a second portion of said mechanical coupling and a second portion of said two-part electrical connector such that at least two of said first control, said second control, said third control, and said fourth control are configured to be removed and replaced.

28. The game controller according to claim 27, wherein said mechanical coupling comprises at least one of a tongue structure, a groove structure, and/or at least one snap fit structure.

29. The game controller according to claim 27, wherein at least two of said first control, said second control, said third control, and said fourth control comprise bumper controls, and at least two of said first control, said second control, said third control, and said fourth control comprise trigger controls.

30. A game controller comprising:
a case comprising a top side, a bottom side, a front side, a rear side, a left side, a left shoulder portion, a left handle portion, a right side, a right shoulder portion, a right handle portion, and a middle portion; and a plurality of controls supported by the case, the plurality of controls comprising a first control disposed proximate said left shoulder portion, a second control disposed proximate said left shoulder portion, said first control disposed above said second control and proximate said top side, said second control disposed below said first control and proximate said bottom side, a third control disposed proximate said right shoulder portion, and a fourth control disposed proximate said right shoulder portion, said third control disposed above said fourth control and proximate said top side, said fourth control disposed below said third control and proximate said bottom side, wherein said case further comprises a plurality of receptacles each receptacle comprising a first portion of a mechanical coupling and a first portion of a two-part electrical connector, and at least two of said first control, said second control, said third control, and said fourth control each comprise a second portion of said mechanical coupling and a second portion of said two-part electrical connector, such that at least two of said first control, said second control, said third control, and said fourth control are configured to be removed and replaced.

31. The game controller according to claim 30, wherein said mechanical coupling comprises at least one of a tongue structure, a groove structure, and/or at least one snap fit structure.

32. The game controller according to claim 30, wherein at least two of said first control, said second control, said third control, and said fourth control comprise bumper controls, and at least two of said first control, said second control, said third control, and said fourth control comprise trigger controls.

* * * * *